United States Patent
Borom et al.

(10) Patent No.: US 9,886,713 B2
(45) Date of Patent: Feb. 6, 2018

(54) ENHANCED SHOPPING AND MERCHANDISING METHODOLOGY

(71) Applicants: Danielle Lynn Borom, Westport, CT (US); Michael Preston Borom, Westport, CT (US)

(72) Inventors: Danielle Lynn Borom, Westport, CT (US); Michael Preston Borom, Westport, CT (US)

(73) Assignee: ASHDAN LLC, Westport, CT (US)

( * ) Notice: Subject to any disclaimer, the term of this patent is extended or adjusted under 35 U.S.C. 154(b) by 0 days.

(21) Appl. No.: 14/673,003

(22) Filed: Mar. 30, 2015

(65) Prior Publication Data

US 2015/0206227 A1 Jul. 23, 2015

Related U.S. Application Data

(63) Continuation-in-part of application No. 13/047,142, filed on Mar. 14, 2011, now abandoned, which is a continuation of application No. 12/701,849, filed on Feb. 8, 2010, now Pat. No. 7,873,547, which is a continuation of application No. 12/357,519, filed on Jan. 22, 2009, now Pat. No. 7,689,473.

(60) Provisional application No. 61/037,820, filed on Mar. 19, 2008.

(51) Int. Cl.
G06Q 30/00 (2012.01)
G06Q 30/06 (2012.01)
G06Q 30/02 (2012.01)
G06Q 90/00 (2006.01)

(52) U.S. Cl.
CPC ......... *G06Q 30/0633* (2013.01); *G06Q 30/02* (2013.01); *G06Q 30/0207* (2013.01); *G06Q 30/0224* (2013.01); *G06Q 30/0281* (2013.01); *G06Q 30/0601* (2013.01); *G06Q 30/0631* (2013.01); *G06Q 30/0639* (2013.01); *G06Q 90/20* (2013.01)

(58) Field of Classification Search
CPC ............... G06Q 30/02; G06Q 30/0255; G06Q 30/0633; G06Q 30/0241; G06Q 30/00
USPC ............................................... 705/26.1, 27.1
See application file for complete search history.

(56) References Cited

U.S. PATENT DOCUMENTS

| 6,986,463 | B2 | 1/2006 | Ludtke |
| 7,171,378 | B2 | 1/2007 | Petrovich et al. |
| 7,308,419 | B1 * | 12/2007 | Myers ........................ 705/14.26 |

(Continued)

OTHER PUBLICATIONS

Unknown author, "Grocereasy 7.0 (www.grocereasy.com), A Program Originally Developed to Assist Handicapped People and Those of Diminished Capacity Due to Chemotherapy or Illness With the Most Common Household Chore . . . Grocery Shopping, Is Now Commercially Available," PR Newswire, Apr. 2, 2003, p. 1,).*

*Primary Examiner* — Brandy A Zukanovich
(74) *Attorney, Agent, or Firm* — John S. Paniaguas; Clark Hill PLC

(57) ABSTRACT

An enhanced shopping system for facilitating grocery shopping and in-store advertising is disclosed. The system uniquely changes (1) the way grocery retail industry captures and retains customers, (2) how customers organize their shopping efforts in grocery stores, (3) the approach to advertising and reaching customers, and (4) the information available to retailers and merchandisers related to customer (a) shopping patterns, (b) responses to merchandising and advertising, and (c) specific impact of discounting/coupons.

45 Claims, 23 Drawing Sheets

UPC Product & Location Information

Generic example:
(Barcode), (Major product category), (Sub category 1), (Sub category 2), (Quantity info), (Description), (Manufacturer), (Aisle), (Section), (Brand/product logo)

Product specific example:
2840000906, Snacks, Chips, blank, Tostitos® Tortilla Chips Bite Size White Corn , 13 oz., Frito Lay® 4, A 4900000045 , Soda, Diet, Cola, Diet cola, 20 oz. bottle, Diet Coke®, Coca Cola®, 7, C

(56) References Cited

U.S. PATENT DOCUMENTS

| | | |
|---|---|---|
| 7,689,473 B2 | 3/2010 | Borom et al. |
| 7,873,547 B2 | 1/2011 | Borom et al. |
| 2001/0001145 A1* | 5/2001 | Barnett et al. ................. 705/14 |
| 2005/0160004 A1 | 7/2005 | Moss et al. |
| 2006/0047577 A1* | 3/2006 | Dietz et al. .................... 705/26 |
| 2006/0265275 A1 | 11/2006 | Perrier et al. |
| 2008/0004891 A1* | 1/2008 | Bostwick et al. ................ 705/1 |

\* cited by examiner

Sample 12 digit Universal Product Code (UPC) Barcodes
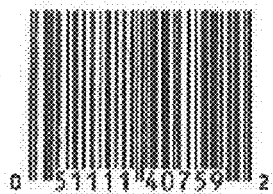
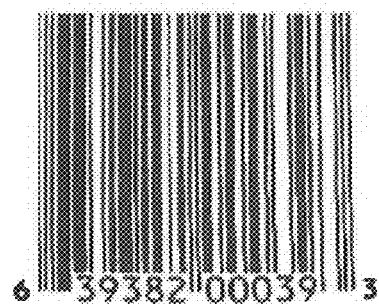
Fig. 3

UPC Product & Location information
Generic example:
{Barcode}, {Major product category}, {Sub category 1}, {Sub category 2}, {Quantity info}, {Description}, {Manufacturer}, {Aisle}, {Section}, {Brand/prodι̇tdogo}
Product specific example:
2840000906, Snacks, Chips, blank, Tostitos® Tortilla Chips Bite Size White Corn , 13 oz., Frito Lay®, 4, A 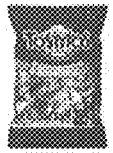
4900000045 , Soda, Diet, Cola, Diet cola, 20 oz. bottle, Diet Coke®, Coca Cola®, 7, C 
Fig. 4

| Aisle/Area | Item | | | | Comment |
|---|---|---|---|---|---|
| 1A | Cereal | | | | |
| 1A | Kelloggs Corn Flakes | | | | |
| 1B | Potato Chips | | Lays potato chips Speed shopper special $1.00 off 20 oz bag | | |
| 2C | Eggs | | | | |
| 3C | Tostitos | | Tostitos – A great chip Speed shopper special $0.50 off 20 oz bag | | |
| 3D | Tostitos Salsa Con Quesa | | Tostitos Salsa Con Quesa HALF PRICE!! | | Linked item |
| 4F | Bacon | | | | Possibly missed? |

Fig. 10A

| Following is a description of how each item in the example above would have flowed through the outlined process: | |
|---|---|
| Item (order on list) | Description of logic: |
| 1 | • No protection was purchased, so generic product was displayed<br>• No other manufacturers purchased the right to switch |
| 2 | • Protection was purchased and specific product description was listed<br>• Brand logo was purchased and displayed<br>• No coupon option was purchased |
| 3 | • No protection was purchased, so generic product was displayed<br>• Lays purchased the switching rights and so coupon and product logo were displayed |
| 4 | • No protection was purchased, so generic product was displayed |
| 5 | • Protection was purchased and specific product description was listed<br>• Brand logo was purchased and displayed<br>• Coupon option was purchased, so coupon and product logo were displayed |
| 6 | • Frito Lay purchased the linkage rights to link its new salsa to the above item (Tostitos), so the salsa was added to the list<br>• Frito Lay also purchase the right to display the brand logo<br>• Frito Lay also purchased the coupon option rights, so coupon and product logo were displayed |
| 7 | • Bacon was added to the list because the consumer historically purchased bacon whenever he purchased eggs.<br>• No switching rights were purchased for bacon, so no coupons were displayed. |

Fig. 10B

Welcome XYZ

▼ Go To | ▼ ?? | Print list

Your shopping list has been compiled

Click here to continue
160

Store logo and tag line here
158

| Aisle | Brand |
|---|---|
| 1 | Kelloggs Corn Flakes |
| 1 | Post Raisin Bran |
| 1 | Oatmeal |
| 2 | Peanut Butter |
| 2 | Sugar |
| 2 | Diet Cola (12 oz cans) |
| 2 | Gatorade |

Items that go with your list:

| | Items |
|---|---|
| Add to list ☐ | Lays potato chips Speed shopper special $1.00 off 20 oz bag |
| ☐ | Smuckers preserves Speed shopper special 50¢ off 12 oz jar |
| ☐ | |

Go To ▼ ??    Print list

Store logo and tag line here

| Aisle | Brand | |
|---|---|---|
| 1 | Kelloggs Corn Flakes | |
| 1 | Post Raisin Bran | |
| 1 | Oatmeal | |
| 2 | Peanut Butter | |
| 2 | Sugar | |
| 2 | Diet Cola (12 oz cans) | |
| 2 | Gatorade | |

| Store logo and tag line here | | |
|---|---|---|
| Aisle | Brand | Coupons |
| 1 | Kelloggs Corn Flakes | $0.75 off a 24 oz box |
| 1 | Post Raisin Bran | |
| 1 | Oatmeal | $0.50 off a 12 oz can |
| 2 | Peanut Butter | |
| 2 | Sugar | |
| 2 | Diet Cola (12 oz cans) | $1.00 of on each 6 pack |
| 2 | Lays Potato Chips | $1.00 off 20 oz bag |
| 2 | Gatorade | |
| 3 | Smuckers Preserves | $0.50 off 12 oz jar |

| ▼ Go To | ▼ ?? | Print list |
|---|---|---|
| ? | Full coupon list | |
| ? | Your possible missed items | |
| ? | Place deli orders | |
| ? | Store categories | |
| ? | Your profile | |

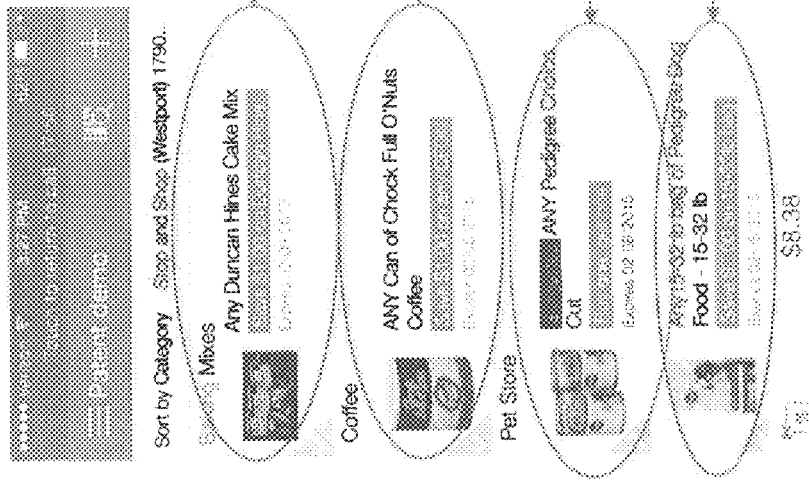

ENHANCED SHOPPING AND MERCHANDISING METHODOLOGY

CROSS REFERENCE TO RELATED APPLICATIONS

This application is a continuation-in-part of U.S. patent application Ser. No. 13/047,142, filed on Mar. 4, 2011, which, is a continuation of U.S. patent application Ser. No. 12/701,849, filed on Feb. 8, 2010, now U.S. Pat. No. 7,873,547, which is a continuation of U.S. patent application Ser. No. 12/357,519, filed on Jan. 22, 2009, now U.S. Pat. No. 7,689,473, which, in turn, claims priority to and the benefit of U.S. Provisional Patent Application No. 61/037,820, filed on Mar. 19, 2008, hereby incorporated by reference.

BACKGROUND OF THE INVENTION

1. Field of the Invention

The present invention relates to an enhanced merchandising methodology for use in grocery and other retail applications.

2. Description of the Prior Art

Grocery stores, as well as other retail markets, are constantly trying to make shopping easier. Bar codes, for example, as illustrated in FIG. 3, are known to be placed on individual retail items and grocery items. Such bar codes enable retail items to be quickly identified by way of a bar code scanner for items being purchased by a consumer, as illustrated in FIGS. 1 and 2.

Consumers are also known to use bar code scanners to scan empty grocery containers at home as the products are consumed to create a shopping list. For example, U.S. Pat. No. 5,047,614 discloses a method and apparatus for computer-aided shopping system for assisting a consumer with shopping. The '614 patent discloses a system in which a consumer utilizes portable bar code scanner 10 having a removable electronic memory, i.e. smart card 132, to scan bar coded items at home after the item has been consumed. In that system, the consumer thereafter removes the smart card 132 from the scanner 10, proceeds to a retail store, and then interfaces smart card 132 with a dedicated terminal 130 in the retail store, wherein the terminal 130 reads data from smart card 132 and then compiles a printed shopping list 60 for the consumer. The shopping list 60 may include quantity, location, and price and arrange the items to provide the customer with a preferred route through the store when picking items.

U.S. Pat. No. 6,513,017 discloses a system and a method for household grocery management. The system includes a bar code scanner 22 operable to scan bar codes on grocery items at a consumer's home. Bar codes on food items that are consumed are also scanned. As such, the system disclosed in the '017 patent is able to maintain a current inventory of household groceries and generate a replenishment list when the inventory of various food items on the list drops below a predetermined value. The system is connected to a grocery clearing house for electronically transmitting the replenishment list to a grocery store by way of the clearing house.

U.S. Pat. No. 7,171,378 discloses a portable electronic terminal and data processing system which includes a portable terminal 40 for use with a personal shopping system 10 in both a user's home 12 and shopping establishment 14. The portable terminal 40 includes a bar code reader for reading bar codes associated with various goods. The data associated with the bar codes is stored in a memory 46 in the portable terminal 40. In order to place an order for the items scanned by the bar code reader, the bar code related data may he transferred from the portable terminal 40 to a host computer 16 or downloaded to an in-store kiosk portable terminal-receiving station U.S. Pat. No. 7,213,766 discloses a multi-interface compact personal token apparatus which. includes a compact personal token apparatus (e.g., standard USB memory stick device) which may be utilized at a consumer's home to store downloaded coupons, wherein the coupons may be redeemed when plugged into a participating grocery store or retail merchant point-of-sale (POS) device, e.g. cash register, kiosk etc.

US Patent Application Publication No. 2002/0027164 A1 discloses a system which includes a portable computing apparatus for use in a weight management program. The system includes a portable computing apparatus, such as a personal digital assistant (PDA 10), for aiding a user in monitoring the consumption of consumable items and in reordering the items. The PDA 10 includes barcode reader 13 for inputting information identifying various items as they are consumed by the user. The PDA 10 may be utilized to prepare a printed shopping list for the person, to show a list using a display, to display a map of the store showing the location of the items ordered, to display a list of items in an order related to the order that they will be encountered in the store, to check off items as they are purchased, and to suggest product alternatives on demand. Additionally, the PDA 10 may incorporate a removable memory for transferring consumable item data to another personal computer.

US Patent Application Publication No 2002/087415 A1 discloses a method and a system for on-line shopping utilizing a personalized shopping list and an electronic network. The method is for ordering items found in a person's home, wherein a personal scanning device is utilized to scan bar coded items to create a shopping list which may be transmitted to a remote location for processing and delivery of the items found on the list.

US Patent Application Publication No 2004/0128210 A1 discloses a marketing information system for remote computing platforms. The system is for managing a consumer's shopping list and for interfacing that list with a retailer's computing system prior to beginning a shopping trip, wherein hand-held computing devices 34 and 35 may be equipped with a barcode scanner for scanning universal product codes ("UPC") on products that a user may like to add to their shopping list. The hand-held computing devices 34 and 35 are configured to be interfaced with the retailer's system to allow the items in the consumer's list to be organized according to how the consumer would encounter them in retail store environment 186, e.g., aisle number and/or shelf location. Additionally hand-held computing devices 34 and 35 may incorporate flash memory 68 to store the consumer's inventory.

US Patent Application Publication No 2006/0047577 A1 discloses a system. and a method for preparing an electronic shopping list and a path through the store. The system matches a customer's shopping list with the order that items are found in a store to optimize the customer's shopping experience.

The use of bar code scanners by consumers for use with grocery items is well known in the art. For example, a trade publication entitled: "CS1504 Handheld Barcode Scanner", http://www.symbol.com/products/bar-code-scanner/general/cs1504; discloses a consumer memory scanner which can be used to scan bar codes on items that can be used with an Internet/Intranet store kiosk. Another trade publication entitled; ""iGrocer—A Ubiquitous and Pervasive Smart Grocery Shopping System", by Shekar et al, SAC 2003, Mar. 9-12, 2003, Melbourne, Fla., http://www.icta.ufl.edu/projects/publications/HELAL-igrocer.pdf, discloses a smart phone with a bar code scanner. Another trade publication entitled; "Intelliscanner™ Kitchen Companion", http://intelliscanner.com/products/kitchen/index.html, discloses a portable bar code scanner for home use for scanning bar codes on retail products at home and creating a shopping list.

Another trade publication entitled; "Symbol Technologies CS 2000 Memory Scanner Endorsed For Use By Leading Web Grocery Companies", http://www.symbol.com/assets/tools/print.html, discloses a portable bar code scanner for use in creating a grocery list. The systems described above are not in wide spread use because of the lack of incentive for grocers and retailers to implement the system. More specifically, the systems described above are simply used to collect, compile, and compose consumer shopping lists. In order to implement such systems, several elements must be put in place—(i) data collection hardware and software, such as barcode scanning equipment at the consumer's site would need to be provided for each consumer; (ii) web portals or a dedicated in-store terminal at the grocery or retail store for processing, compilation, and printing would need to be established; (iii) a database of available grocery or retail items would need to be stored and accessible by the terminal would need to be built, maintained and continuously updated as grocery or retail items are added or dropped from the store's available merchandise to facilitate the process and, for those systems which provide locations for grocery or retail items on a shopping list, updated every time any grocery or retail items changed locations or were located or relocated to a free standing point of sale display; and (iv) other elements of cost such as customer support.

Unfortunately, such systems require a significant and continuous investment in overhead while providing little or no value or incentive to the grocer or retailer or the food item vendors. As such, the systems disclosed above are not in widespread use. Consequently, consumers must continue to shop in the conventional and cumbersome manner even though technology is obviously available that would greatly facilitate shopping. Thus, there is a need to provide incentive to grocers and retailers to adopt such systems in order facilitate consumer shopping.

SUMMARY OF THE INVENTION

The present invention relates to a system for facilitating grocery or retail shopping for consumers while providing incentive to consumer packaged goods manufacturers ("CPGs"), grocers and retailers to provide the system. The system includes a portable seamier with a memory device, such as a portable memory device. In one embodiment, the system may include an in-store terminal, for example, configured as a standalone terminal or a part of computer network. The in-store terminal is used to receive the information from the memory device and print out the shopping list. In an alternative embodiment, the application may be web-based obviating the need for an in-store terminal. In the web-based application, the shopping list may be displayed, for example, on a smart phone, or printed from any terminal connected to the Internet. From a shopper's perspective, groceries to be purchased are scanned at home after the items are consumed to form a shopping list that facilitates shopping. In essence, the system is a replacement of the traditional hand written "shopping list" used by many consumers. In accordance with an important aspect of the invention from a grocery or retailers perspective, the system provides incentives to grocers and retailers to implement the system by way virtual merchandising which can be sold to product manufacturers to provide additional income to such grocers and retailers. These additional sources of income provide the incentives for grocers and retailers to implement and maintain the system. Since each item on the consumer's list is uniquely identified, the retailer can provide manufacturers with product specific "virtual merchandising" opportunities which may include (i) "protecting" a manufacturer's product on the shopping list by advantaging said manufacturer's products over other competing products by displaying additional information about said manufacturer's products such as brand information (e.g. brand logos versus no logo, brand name versus a generic description of the item, coupons/discounts and/or nutritional information), thereby providing "virtual shelf space", increasing the shopper's brand awareness, and increasing the probability that a consumer repeats the purchase of the consumed product; (ii) allowing a manufacturer to provide or suggest substitutes and associated coupons for the suggested substitute product, if the consumed item was not "protected" by that product's manufacturer (i.e. products for which no product protection has been purchased); (iii) allowing a manufacturer to add suggested products (specific & branded) to a consumer's list in an effort to pull through complementary product sales, thereby "virtually merchandising" an associated product; and/or (iv) tracking consumer purchasing patterns and suggesting when a product might have been left off of the list. An example of virtual merchandising is—if the consumer purchases buns with hot dogs and the list includes hot dogs but no buns, the system can prompt the customer with respect to hot dog buns. An additional example would be if a consumer adds Brand A of cake mix (not protected) to his/her list and Brand B is a protected brand of cake mix, the consumer's list would have Brand A on the list as either a more generic description (e.g. cake mix, chocolate cake mix or even perhaps "Brand A Chocolate Cake Mix" while Brand B would be suggested, such suggestion to include a more fulsome description (e.g. "Brand B Super Deluxe Chocolate Cake Mix" with a brand logo and a coupon associated with purchasing Brand B). As such, the virtual merchandising generates income opportunities in the form of advertising and shelf space revenues, additional sales opportunities, and customer retention to grocers and CPGs which will provide incentives to them to put the necessary elements in place to drive such a system into everyday use.

DESCRIPTION OF THE DRAWINGS

These and other advantages of the present invention will be readily understood with reference to the following specification and attached drawing wherein:

FIG. 3 illustrates various types of known bar codes.

FIG. 4 illustrates an exemplary record layout of the product specific information that would make up the global product information database that could be maintained centrally for all products or could be maintained by each retailer.

FIG. 10A illustrates an exemplary shopping list which illustrates virtual merchandising in accordance with the present invention.

FIG. 10B is a table explaining how each item in the shopping list illustrated in FIG. 10A would have flowed through the process in accordance with the present invention.

FIGS. 11-16 illustrate exemplary dialog screens for composing a shopping list in an interactive mode.

FIGS. 19A and 19B represent an exemplary illustration indicating application of enhanced shopping system.

DETAILED DESCRIPTION

Figure 1:
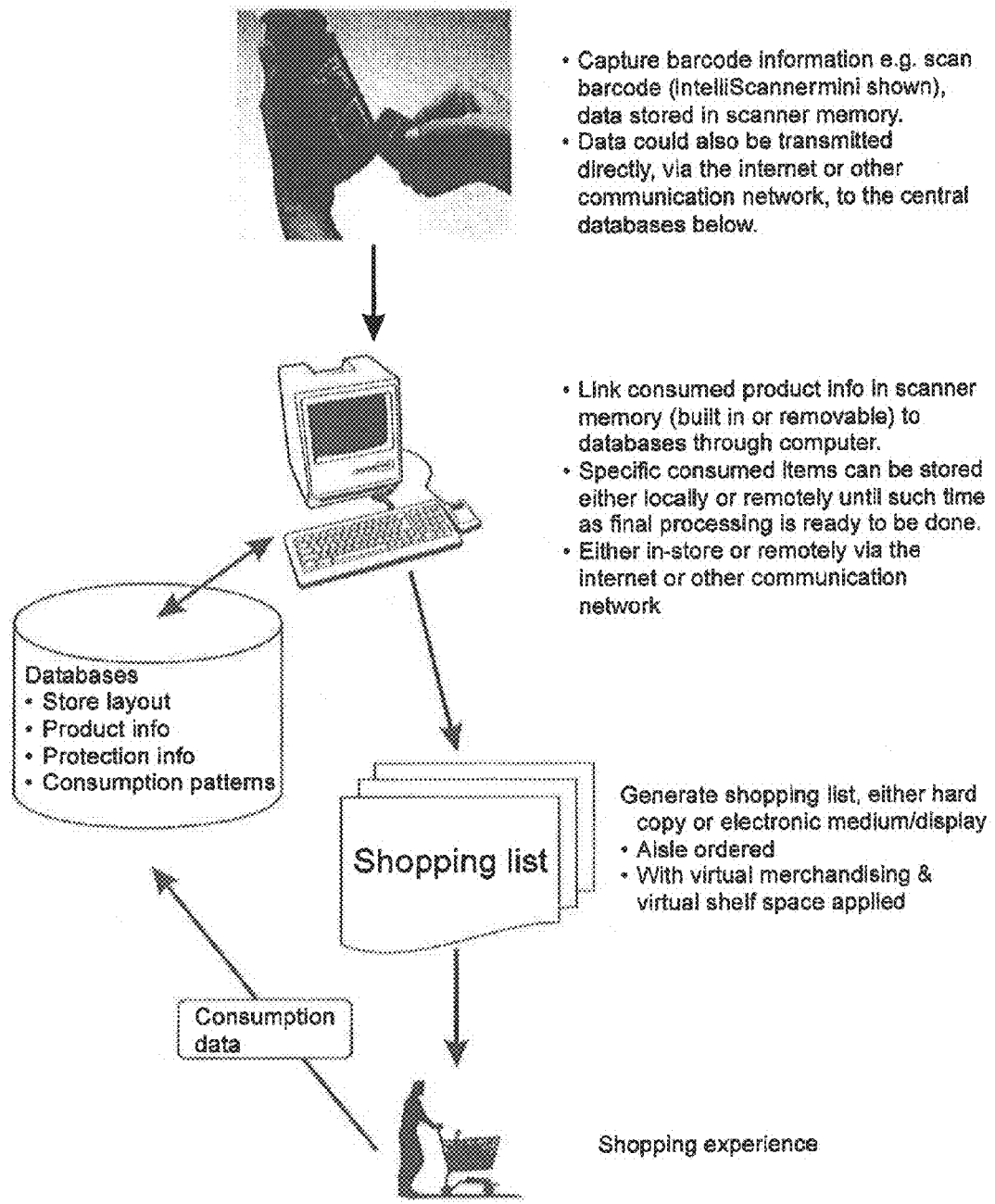
FIG. 1 is simplified diagram illustrating the basic operation of a scanner, in which the scanner scans the barcode and picks up the signals from the different lengths of the barcode, unique product code, or UPC. This data is then sent to a computer (either on-line or at the grocery store) where it is processed against various databases, linked by together by the unique UPC. This processing covers ordering the list by aisle, performing the various virtual merchandising algorithms, and compiling the users shopping list. This information is then turned from traditional data format into a language that is easily readable by humans. Next, the information is printed on hard copy, or in alternate form displayed on a portable device, which will allow for a quick and easy shopping trip.
Figure 2:
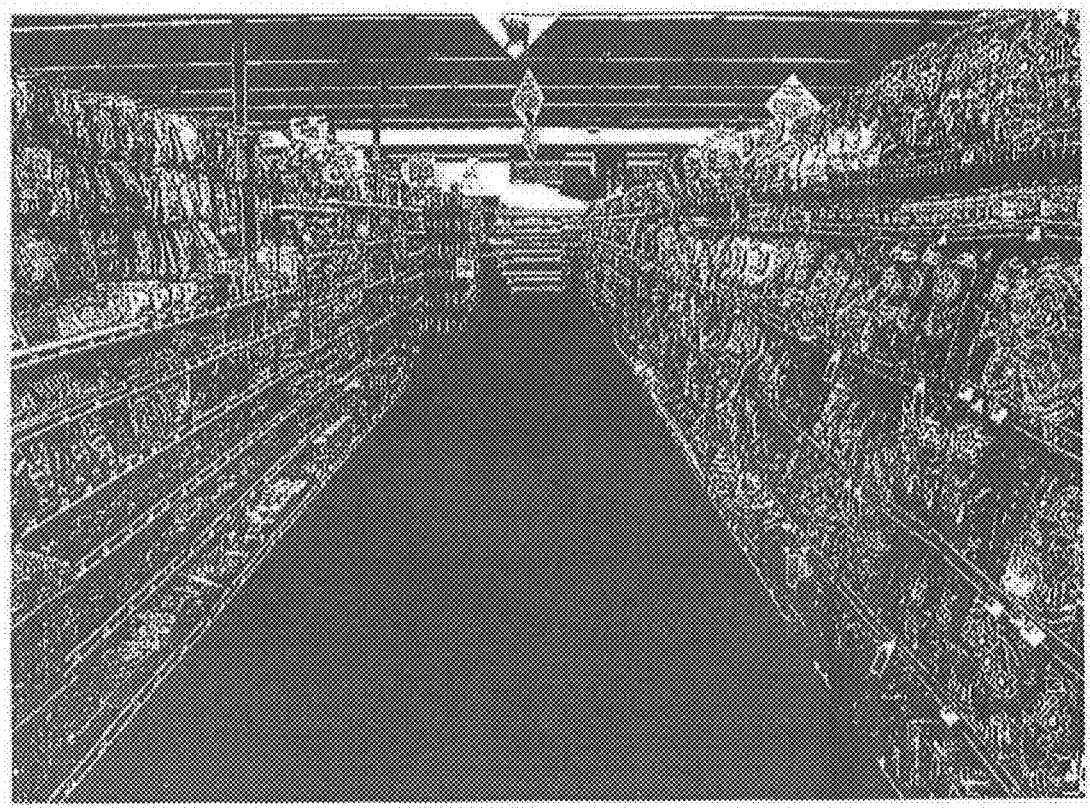
FIG. 2 is an exemplary diagram of an aisle in a supermarket in which different foods of the similar type are normally located in the same aisles to make it easier for customers to locate.

The present invention relates to an enhanced shopping system and method which utilizes technology and information in a manner which uniquely changes (1) the way grocery retail industry captures and retains customers, (2) how customers organize their shopping efforts in grocery stores, (3) the approach to advertising and reaching customers, and (4) the information available to retailers and merchandisers related to customer (a) shopping patterns, (b) responses to merchandising and advertising, and (c) specific impact of discounting/coupons. Even though the application focuses on the grocery retail industry, the concepts are equally applicable to any retail segment where consumable goods are involved (e.g. also applicable to small business office supply segment).

This system and method will create a new type of program for the home. In particular, in one embodiment, the system enables groceries to be scanned after use and stored on a portable memory device, such as a flash drive, smart card, smart phone, or directly within a small, portable scanner with memory and data ports. In that embodiment of the invention, the portable memory device is brought to the supermarket like a virtual shopping list. An in-store terminal may be provided that is configured to receive the portable memory device. The in-store terminal checks the inventory of the items on the shopping list and also adds the location of the items on the grocery list within the store. In an enhanced version of the system, at least one virtual merchandising logic element is added to the list. The in-store terminal then prints out a shopping list for the consumer as illustrated, for example, on FIG. 10A. The scanner and memory can be incorporated into off the shelf devices, such as a cell phone or PDA, which would make the concept even more ubiquitous.

Multiple embodiments of the system are contemplated from a consumer's side. Both embodiments may include a portable scanner and a memory device. In a first embodiment, an in-store terminal is provided. The in-store terminal is configured to receive the data from the memory device. In this embodiment, a database is either resident in the in-store terminal or the database is resident on another server or computer and in communication with the in-store terminal by way of a communication link. In a second embodiment of the invention, the system is web based and does not require an in-store terminal. In the second embodiment, the data from the memory device associated with the scanner is downloaded directly to a remote server which processes the data and enables a shopper to display and/or download and print a shopping list directly from their computer. An alternate embodiment of the invention is disclosed from the standpoint of the manufacturer or retailer which provides optional virtual merchandising.

In the various embodiments include an in-store terminal embodiment and a remote server embodiment, accessible by a smart phone, these embodiments include data on all for all but a few) items available in the store. The data on the types of food may also include brand data. For example, as will be discussed in more detail below, an entry for potato chips may include data regarding multiple brands, such as Lays and Doritos. For perishable items, such as, fresh meat, cheese, and fish, a different format is used. For example, such perishable items may be included by category, such as Meat, cheese, fish, baked goods, etc. These perishable food items may be further broken down into sub-categories. Using meat as an example, the sub-categories include the type of meat, e.g. turkey; the brand; and the amount, for example, in pounds.

In order to provide an incentive for grocers and retailers to implement the system, the customers, the retailers, and the manufacturers must gain value from it. The customers perceive value through an enhanced and more efficient shopping experience. The retailers gain value through "stickier", i.e. more loyal, customers, increased sales, and additional merchandising and advertising revenues. The manufacturers will gain value through more targeted marketing and advertising and increased visibility through "virtual" merchandising (virtual shelf space—product protection and/or brand display; switching and retention incentives; product linkage, and consumption patterns). Given these attributes, the concept, in addition to being a new approach, can be implemented without significant technological. barriers.

Value to the Customer

As the hardware cost associated with hand held scanners has fallen, the availability of significant amounts of memory has increased, and the availability of smart phones with built in scanners and the tech savvy of the average consumer has risen, the ability to move to a new type of replenishable shopping process has become realizable. Following is a description the process from the customer's point of view.

Goods Capture Process:

From a consumer's standpoint, the an initial objective of the invention is to establish a process where consumers utilize existing scanning technology to create "shopping lists" of grocery items. Consumers capture a record of the products they consume and generate a replenishment listing using existing scanning technology and scanning software, such as distributed by Intelliscanner Corp., has reached a point where the cost to produce consumer level scanners and capture consumer data is affordable and such technology can be distributed to consumers to assist in the replenishment process associated with consumables (e.g. groceries).

In addition, shopping lists could be generated by linking product UPCs or SKUs to recipe cards and, by scanning a given recipe card, a shopping list could be generated. This concept is not discussed in this paper, but it is conceivable that manufacturers might purchase rights to link to recipes and thereby increase sales.

Aisle Aligned Shopping List:

Then, by matching the "shopping lists" with store product layouts, an "aisle aligned shopping list" may be generated. This process will make the consumer's shopping experience much more user friendly by replacing hand written shopping lists that are generally written in consumption order with printed shopping lists that are organized in the order the products are arranged throughout the store. With the evolution of technology and the rapidly falling price of computer and smart phone hardware, this concept can be implemented on an electronic tablet interface or a smart phone that the consumer can utilize throughout the store, making the experience much more interactive.

This matching of shopping list items to store layouts can be done using data gathered during a retailer's inventory or store mapping process, during which UPC/SKU locations would he accumulated. This data is available today for some retailers but is not utilized in this manner as the consumer does not accumulate his/her shopping list by UPC/SKU.

These initial steps will make use of the process valuable to the consumer and ensure use by the consumer. It also has value to the retailer, discussed below.

Value to the Retailer

Another objective of the invention is to leverage the above methodology in such a manner that stores and manufacturers can present opportunities to the consumer on an extremely targeted basis. This targeting will generate revenue for the store and will more effectively use the manufacturers' advertising and merchandising expenditures by targeting the point of use. This concept breaks into several basic elements of value, all under the concept of Virtual Merchandising—Virtual Shelf Space (Virtual Product Protection and Brand Display, Partner Incentive Enhancements), Switching Incentives, Consumption Patterns Additions, the use of Product Linkages, and Information Capture.

"Virtual Merchandising (Shelf Space)—Product Protection"

Manufacturers typically purchase the rights to physical shelf space, generating revenue for retailers. Using this concept, retailers or, in a retailer agnostic version, the application company, will be able to sell "virtual shelf space" to manufacturers. As a result, the retailer or the application company will be able to expand a manufacturer's shelf space by selling "virtual product protection" to the manufacturer. If a given manufacturer purchases "virtual product protection" for its product or product category, any time a consumer has selected a "protected product" on a shopping list, the protected product will be displayed on the consumer's shopping list and will not be switched with an equivalent products for which virtual product protection was purchased. This is the equivalent of expanding the manufacturer's shelf space to exclude all other options, increases the visibility to and probability of replenishments by the consumer.

As will be discussed in more detail below, there are various types of virtual merchandising options.

Virtual product protection simply protects a product from being switched on a shopping list with a comparable and competitive product. For products that are protected with virtual product protection, only the protected item including its respective brand name are displayed on the shopping list. If virtual product protection is purchased, one or more of: Brand Display; Partner Incentive Enhancements and Product linkage may also be purchased. Alternatively, Brand Display; Partner Incentive Enhancements and Product linkage may be purchased without "virtual product protection". In this embodiment, if one of Brand Display; Partner Incentive Enhancements and Product linkage are purchased, the product will be protected from switching even though "virtual product protection was not purchased.

Brand Display protection not only protects a product from being switched but also displays the product logo of the product.

In addition to virtual product protection, manufacturers purchasing "virtual product protection" also have the right to purchase "partner incentive enhancements". The partner incentive enhancements option allows manufacturers to display coupons and/or special offers as an incentive to purchase a product irrespective of whether any other virtual merchandising options have been purchased. Partner Incentive Enhancement prevents also protects a product from being switched. Alternatively, the partner incentive enhancements may he offered as a part of virtual product protection, discussed above.

Product linkage is also comes under the auspices of product protection. As will be discussed in more detail below, product linkage is based upon the concept that certain products are linked to other products. In this type of product protection, the base product is covered by product protection.

As an example of virtual product protection, if the Coca Cola Bottling Company purchased virtual "product protection" for its cola products and a consumer has specified Diet Coke® on their shopping list, Diet Coke® (and the brand image if Brand Display, i.e. its logo, is also purchased), Diet Coke® and its logo would be displayed on the shopping list. If the Brand Image protection is not purchased, then "Diet Coke" would be displayed on the shopping list without a brand logo. Using the above example, assuming the Coca Cola Bottling Company purchased virtual product protection, the Company may also purchase partner incentive enhancements which provides an additional right to display any discounts and/or coupons associated with this product to further enhance the "virtual product protection". This enhancement can be used-to increase the probability of replenishment, the success ratio of which can be measured and correlated to the associated discount amounts.

"Virtual Merchandising (Shelf Space)—Brand Display"

This option allows a manufacturer to have the ability to purchase the right to have its brand logo displayed on the customer's shopping list, virtually expanding its shelf space and the interaction of its brand with the consumer, thereby increasing the "stickiness" of the product on the list (in other words, lowering the propensity for a customer to select another brand) and increasing the consumer's brand awareness.

This brand display option may be acquired in addition to virtual product protection module, as discussed above or purchased without virtual product protection. Similarly, "virtual product protection" can be purchased with or without "brand display" option.

As will be discussed below, the "brand display" option may also be purchased with a "product linkage" option. "Product linkage" also falls under "product protection" (e.g. why would a manufacture pay for a product to be linked and then have a competitor's product be displayed).

"Virtual Merchandising—Product Linkage"

Retailers and manufacturers spend significant amounts of money and time attempting to physically link compatible products together using product placement. Product placement leverages the concept that certain products are linked to other products (e.g. chips and salsa, hot dogs and buns, charcoal and lighter fluid, etc.). Retailers and manufacturers arrange products within the stores to leverage on these purchasing relationships—typically through the use of side by side shelf display, clip strips and hanging displays, end cap arrangements and floor displays. Unfortunately, this product placement concept requires moving product physically in a selection of test stores, testing the success rate and, if successful, rearranging an entire retail chain of stores. This is an expensive and time consuming process and one that cannot be implemented and modified quickly.

The concept here is to establish the product placement linkages virtually and enable the retailer to sell the rights to such linkages to manufacturers. This concept is the selling of "virtual merchandising—product linkages". Using the customer's shopping list, manufacturer's will have the opportunity to identify given products on a consumer's shopping list and virtually link their complimentary products, thereby adding these complimentary products to the consumer's shopping list. These complimentary products can be identified as complimentary to product "X" on the shopping list, highlighted for the consumer as complimentary add-ons, and displayed in the aisle where they are located. This enables the consumer to purchase the product in an orderly manner while enabling the manufacturer to link and "display" the complimentary products together.

A retailer establishes a series of linkages and, if the base product is on a shopper's list, the linked product (this linkage purchased by a manufacturer) is displayed as a possible paired product, including the product details (brand, label, and coupon). If accepted, this product is placed on the shopping list in the aisle that the product is placed within the store. This operation places the linked product next to the base product without actually relocating either product, saving the retailer and the manufacturer money and enabling them to rearrange the store virtually.

For example, a linked product could be added with a tag line, e.g. "Bachman® Pretzels go great with Beer". In this example, the base product may be Miller Genuine Draft beer. In this example, anytime Miller beer is specified by a consumer on a shopping List, the tag line would also be displayed. The linked product is "Bachman® Pretzels. The idea here is to sell more of the base product by linking it with the linked product.

Another example of linking products follows—if Frito Lay, Inc. is trying to sell more of its Jalapeno Cheese dip (located in aisle 3, for example) by pairing it with Tostitos® chips (aisle 6 in this example), Frito Lay, Inc would have several options. It could add a coupon to the Tostitos® chips and hope the consumer used this on the current or next trip to the store, it could move the dip to aisle 6, or (using virtual merchandising) it could add a tag line and/or assuming that product enhancements is also acquired, a coupon may be displayed t on the grocery list of consumers that were replenishing Tostitos® chips (e.g. "Jalapeno Cheese dip goes great with Tostitos® chips" and a $0.50 off Jalapeno Dip with the purchase of Tostitos). The Jalapeno Cheese dip suggestion and coupon would display with the rest of the items found in aisle 3. In essence, the manufacture would have virtually moved the cheese dip next to the Tostitos® Chips and displayed the coupon next to the cheese dip. An option in the interactive mode would be to prompt the consumer and the consumer would accept or reject the suggested product (Jalapeno Cheese dip in this case). This is a very targeted linkage of products, one which manufacturers utilize regularly, especially with the introduction of new products.

Another example of product linking follows. If Skippy® Peanut Butter purchased the rights to link its peanut butter to ALL brands of jelly, Skippy® Peanut Butter would be added to the list, along with the Skippy® brand (if purchased) and any incentive schemes Skippy® wished to display (e.g. 25 off a 20 oz jar) each time a consumer purchased jelly. This is a broader application of the Frito Lay® scenario. Alternatively, if product linkage 26 has not been purchased by the manufacturer for an item on the shopping list, the system 20 looks up known unprotected and/or protected potential linked items and optionally adds the unprotected or protected items to the list as a suggestion.

A virtually endless selection of combinations could be derived and sold. Retailers could also put limiters in the program to ensure that a customer's list did not grow to be unmanageable by adding too many alternatives. The retailer could also apply a ranking algorithm similar to that discussed above to "arbitrate" when more than one manufacturer wanted to link to a base product (e.g. if both Skippy® and Jif® wanted the jelly link), although these are minor alterations/tailoring of the basic concept of "virtual merchandising—product linkages".

A ranking algorithm can also be used for product linkages. Such a ranking algorithm is similar to the ranking algorithm used for switching alternatives. The ranking algorithm used in this application can also be based upon occurrence slots, for example, as defined above. In this application, the linkage of product A to a matching product could be sold to multiple manufacturers by selling "occurrence slots", as defined above. For example, a store could sell four (4) "occurrence slots" to link beer to snack foods. If the four (4) occurrence slots were bought by four (4) different product manufacturers, each manufacturer would take its turn in the occurrence rotation, in a similar manner as discussed above. Alternatively, an individual manufacture could purchase all four (4) slots and have different products or promotion campaigns rotate through the line up, allowing the manufacturer to analyze the effectiveness of the linkage and/or the advertising/promotion.

All of the above virtual merchandising concepts are true point of purchase advertising as the consumer has indicated that he/she desires to purchase a given product and this product is either "protected" or alternatives are provided. There is no random pop-up concept or mass marketing.

Each of these virtual merchandising applications would (1) be an enhancement for the customer, (2) drive higher revenue for the store by ensuring potential items were not missed, and (3) represent point of purchase marketing opportunities that could be purchased by manufacturers to enhance their sales.

"Virtual Merchandising—Switching Incentives"

For products that are on the consumer's shopping list and for which Product Protection has not been purchased, other manufacturers that have purchased "virtual merchandising—switching incentives" would have an opportunity to present specials and discounts associated with their products that are substitutes for the unprotected product. For example, if a consumer specifies Seventh Generation laundry soap on their shopping list and no product protection was purchased for the Seventh Generation product, the specified product would be subject to suggestions for alternate products for which switching incentives were purchased. For example, if a switching incentive is purchased for an equivalent product, a button, identified as "other offers available" may be displayed beneath the specified product. In other words, the display of the specified product may automatically be switched to a display of the specified product along with a user selectable option, such as a button, for "other offers available". Selection of the "other offers available" button may automatically display a substitute product that may be substituted for the specified item without displaying the selected item. Alternatively, selection of the button may result in the substitute product being displayed along with the specified product along with optionally displayed coupons or other offers. For example, if a switching incentive is purchased for Arm & Hammer laundry soap, the Arm & Hammer laundry soap may be displayed alone with the specified item. Optionally the Arm & Hammer laundry soap may be displayed along with a coupon or discount offer if product enhancements were also acquired. Another user selectable option, such as a button identified as "Replace", may also be provided with the substitute item being displayed. Selection of the "Replace" button switches the specified item on the grocery list with the substitute item. In the above example, above, the Arm & Hammer laundry soap would he substituted for the Seventh Generation. laundry soap if the "replace" button was selected.

The switching may alternatively result in automatic switching of the entry on the shopping list. Using the example mentioned above, if a consumer specifies Seventh Generation laundry soap on their shopping list and no product protection was purchased for the Seventh Generation product, the specified product would be subject to suggestions for alternate products for which switching incentives were purchased. In this embodiment if a switching incentive was purchased by Arm & Hammer for laundry soap, then, the Seventh Generation laundry soap would be automatically switched to Arm & Hammer laundry soap with coupons if product enhancements were also acquired. If no switching incentives have been purchased, just a generic or brand description of the item is may be displayed without a logo. For example, if the RC Cola Company had not purchased "virtual product protection" and the consumer has RC Zero Cola® on their shopping list, the shopping list may display "Diet Cola" (no brand or image) or alternatively RC Zero Cola with no image. Assuming no switching protection has been acquired for an item on the shopping list, the system may search for alternative unprotected items and display the product coupons, specials, rebates, discounts and/or the manufacturer's brand logo for the alternate product alongside the generic shopping list item to incentivize the consumer to switch brands. Alternatively, assuming "virtual product protection" is not purchased and the consumer identifies a brand on the shopping list, such as RC Zero Cola®, no image will be displayed adjacent the item, however, the brand, for example, as designated by the consumer, may be displayed. In this example, RC Zero Cola® brand may be displayed without a logo or the item may be alternatively displayed as a generic item, such as diet cola, as mentioned above. In this case, the product is vulnerable to being switched.

A ranking algorithm may be implemented to allow rotation of manufacturers or, in the case of an interactive, on-line process, would allocate different amounts of space or assign different positioning of ads on the screen depending on what was purchased. For example, a ranking algorithm may be set up in terms of "occurrence slots. An occurrence slot may he defined as an unprotected item on a shopping list that is therefore subject to "switching", as discussed above. The occurrence slots may be sequentially based. For example, a subscription of time based slots could be offered for sale for a particular period of time, for example, one (1) year. The slots, for example, could he based upon the sequential occurrences of the unprotected item. over the subscription period on a rotating basis. The number, price and length of the subscription periods of the occurrence slots may be set by the store.

The use of a ranking algorithm allows multiple manufacturers to purchase the switching rights for the same individual, groups or categories of unprotected items. For example; assume that two soda manufacturers, identified as Manufacturer A and Manufacturer B, want to purchase switching rights for all unprotected soda. Also assume that the store sets up and sells four (4) "occurrence slots" for switching unprotected soda to manufacturers that purchase product switching rights. Further assuming that Manufacturer A purchased one (1) slot and Manufacturer B purchased three (3) slots, the switching rotation would be that Manufacturer A would get the switching rights to the first shopping list and Manufacturer B would get the switching rights to the next three (3) shopping lists. The next unprotected item would then rotate back to A and so on. For example, the pattern would be: A-B-B-B-A-B-B-B and so on, as consumers with shopping lists with unprotected soda occurred in the store. An individual manufacturer could purchase all 4 slots and have different products or promotion campaigns rotate through the line up, allowing the manufacturer to analyze the effectiveness of the linkage and/or the advertising/promotion.

Each grouping of products is linked to a hierarchy of product categories established by the retailer. This hierarchy establishes the backbone for product protection as well as the offering of alternatives. It also drives the offering of paired products as described in the following section.

"Virtual Merchandising—Consumption Patterns"

"Virtual Merchandising—Consumption patterns" utilizes a customer's normal buying patterns and frequencies to establish a baseline pattern, compares this expected set of items to those on the customer's shopping list, and highlight items that it appears the customer might have missed on the shopping list. A frequency forecast and a forecast based on the frequency certain products can be purchased together and used to establish the expected list of products. This expected list is compared to the actual shopping list and potential missed products are added to the consumer's list or, in an interactive mode, the consumer is queried as to Whether or not these items should be added to the list. These items would then be put through the above virtual shelf space and virtual merchandising scenarios as the original list or this could be done initially and followed by the virtual shelf space and virtual merchandising scenarios. In either case, the end shopping list should be the same.

For example, if a customer purchases bacon every time they purchases eggs, bacon would be offered as a potential missed item if eggs were on the shopping list and bacon was not. In addition, if Kraft Foods purchased coupon rights for situations in which bacon is on a shopping list and "unprotected" (which all items added in this manner would be since they would. be generic rather than brand specific), the coupon would be displayed in this scenario, thereby extending the component of "virtual product protection" that links advertising rights to "unprotected" products. A similar scenario would play out based on frequency models.

In addition, if a customer purchased a given product on a regular basis, but the current shopping list did not list that product, and the algorithm did not indicate to add the item, the consumption pattern option is configured to add the items to the shopping list and highlight them. In one embodiment of the invention, this option can be incorporated with other data and only add items to the shopping list, for example, that are on sale. This option therefore highlights the buying opportunity for the consumer and even though the item was not selected, further enhances the shopping efficiency of the customer and expand the advertising reach of the manufacturer in a targeted manner. Using this methodology, a retailer could predict how many times a certain product would either be selected by consumers or flagged to remind consumers, giving merchandisers a much better feel for the potential market of an add campaign. The retailer could limit the number of items added to a consumers shopping list to ensure the list did not become too cumbersome or cluttered.

Information Capture

Unlike the information that is available today, the information that would be captured using this process links the exact items consumed (as collected during the scanning process and preparation of the consumer's shopping list) and the end products purchased. In other words, manufacturers know both the behavioral outcome as well as the specific consumption activities immediately prior to the activity (or lack thereof) they are trying to drive. The exact effectiveness of these marketing strategies would be available, unlike the "rough estimates" that are associated with existing marketing and merchandising efforts today. This is because the items consumed and desired to be replaced are not known in any application today. In order to attempt to obtain this information, manufactures spend millions hiring firms that conduct exit interviews with consumers. These exit interviews, while being expensive and incomplete, are the best proxy manufactures have for the information that could be Various different types of scanners can be used for scanning the barcode. There is a wireless portable scanner, a portable batch scanner, and a fixed scanner. The wireless portable scanner is ideal for remote locations or when one needs the information right away (1). The information for this scanner is uploaded very quickly and accurately when scanning something. The negative aspect of a wireless scanner is that it needs to be connected through a wireless network which requires more cost and technical know-how. The portable batch scanner is a battery operated seamier that uploads that data at a different time from when it is scanned, This is an ideal scanner if mobility is the number one priority, like in a factory or an individual's kitchen/home. A fixed scanner is attached to a computer through a cable and is transmitted as if it were being typed into the computer from a keyboard (1). This would not be the best type for in the kitchen of an every day home. The wireless portable scanner would probably be the best scanner to use in a large scale, industrial application because of its mobility and quick response, while the portable batch scanner, with its mobility and lower cost/infrastructure, would be the best hardware for a consumer application. Most scanners come with a cable to attach to the computer.

Scanners get the information off of a barcode by waving a strip of red light in front of the barcode. What the scanner does not see is that the light source absorbs the difference between the black and white spaces. This information is converted into an electrical signal. The light source starts out scanning a white space, which is called the quiet zones, and then continues to move along to the last bar. The light source keeps passing over the barcode until it reaches the white source on the other side of the barcode. Different heights for the barcode are chosen to make it easier for the scanner to be able to read it. If there is more information to be encoded, then the barcode is longer, and when the length of the barcode is increased, so are the height and spaces of the barcode.

The type of barcode that is mandatory for all supermarkets is a UPC/EAN barcode (3). UPC barcodes are set at a fixed length and are usually only used in the grocery department They were designed just for the supermarket because that type of barcode fits the twelve digits that are needed for the groceries. There are also other types of barcodes, such as Code 39, Code 128, Postnet, and PDF417 but those types are not used in the grocery store industry (2).

Software Flow Charts

Figure 5A:
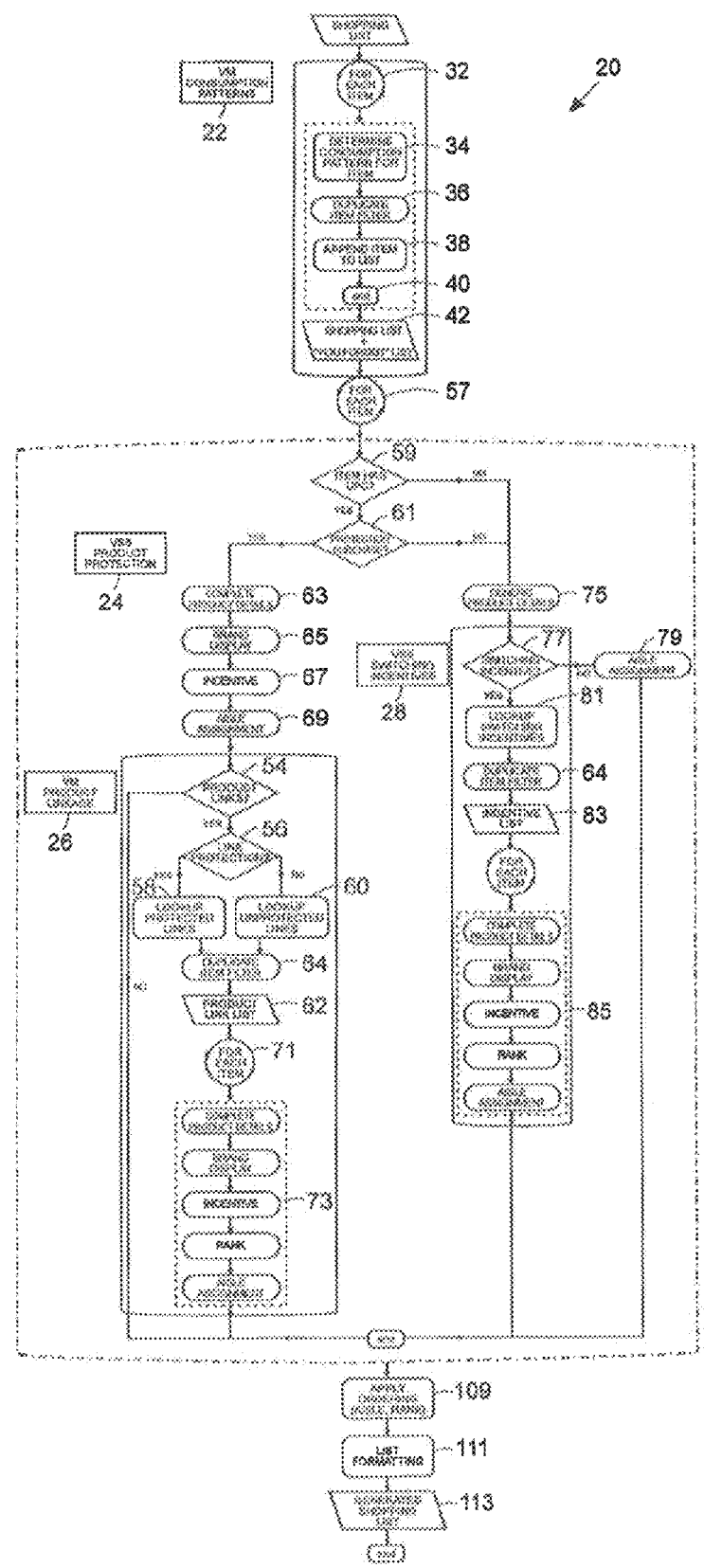
FIG. 5A is a data flow diagram of the system in accordance with the present invention.

FIGS. 5A-5H illustrate the logic flow of the exemplary processes in accordance with the present invention. FIGS. 6-9 illustrate exemplary flow charts for the invention. Referring first to FIG. 5A, this figure is an exemplary top level diagram for the present invention. It is to he understood that FIG. 5A is for illustration purposes and illustrates an embodiment in which all virtual merchandising options are incorporated. It is to be understood that the present invention may be implemented with one or more of the virtual merchandising options. The order in which the logic is implemented within the flow chart can be modified and, in many scenarios, achieve the same end result. As such, the order of the logic is not of critical importance.

The shopper scans in the bar codes for grocery items, for example, that have been consumed and. forms an initial shopping list, for example, as illustrated in FIG. 1. In accordance with an important aspect of the invention, the system, generally identified with the reference numeral 20, processes the initial shopping list, as discussed below. The processing may include one or more virtual merchandising options, as illustrated in FIG. 5A, implemented, for example, as software modules relating to virtual merchandising options, such as, consumption patterns 22, product protection 24, product linkage 26, product switching incentives 28 and product brand display 30.

Figure 6:
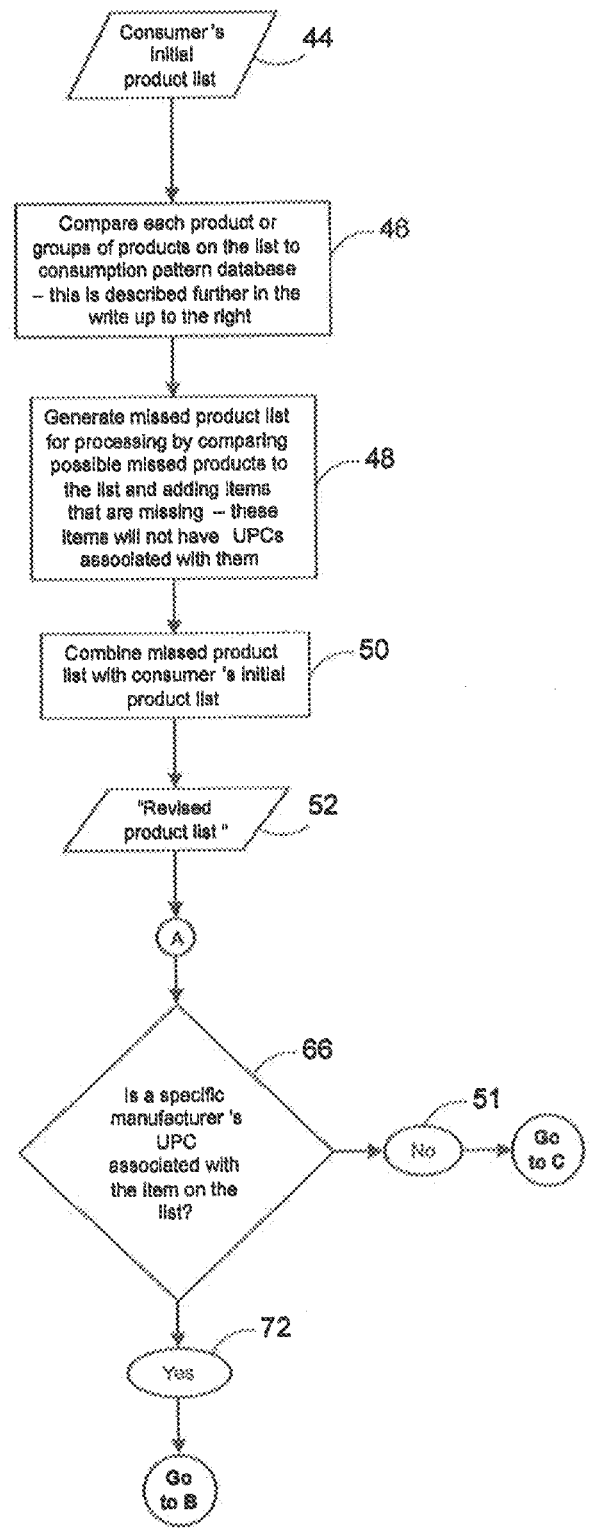
FIGS. 6-9 illustrate exemplary flow charts for the invention.

For each item on the initial shopping list, the system 20 may initially determine the consumption pattern 22 for the item in step 34 and illustrated in more detail in FIG. 6. After the consumption patterns 22 are determined, the system 20 checks for duplicate items in step 36 (FIG. 5A) and adds any missing items to the initial shopping list based upon the consumption pattern in steps 38 and exits the consumption pattern module 22 in step 40 and may indicate the missing items on the shopping list under a heading "You Forgot", as indicated in step 42, or identified as "Possibly missed", for example, as illustrated in FIG. 10 for the bacon.

The system 20 checks each item on the initial shopping list, as indicated in step 57. After the initial shopping list is created by the consumer and optionally enhanced by the system 20 based upon consumption patterns, as discussed above, the system 20 obtained if this application was implemented and the data collected. The retailers and manufacturers would be able to utilize the results associated with various marketing and merchandising strategies to measure the effectiveness of each strategy. For example, the Coca Cola® Bottling Company could measure the effectiveness of its protection strategy with and without coupons or with coupons at various discount price points.

Technology/Ideas:

Following is a listing of known technology that may be associated with delivering the above concept to market.
1. Bar code/UPC/SKU information.
2. Bar code/UPC/SKU information capture technology (e.g. scanners) would be used to generate the initial shopping list and would capture the necessary item information, including product description, at the manufacturer level.
3. Retailer master files.
4. Store specific store product layout files containing aisle, section, UPC, SKU and other information and maintained by the retailer. Companies that take inventory today can capture the location within the store (e.g. aisle, department, and shelf) of each item through a mapping exercise which results in a database of store level product locations.

The invention is amenable to being implemented with various types of scanners which are well known in the art. Such bar code scanners usually consist of three parts; a scanner, a decoder, and a cable or wireless link that connects the scanner to a computer (1). FIG. 1 illustrates how the scanner reads the spaces and bars making up the barcode and provides an electrical output to a computer. The decoder decodes the spaces and the bars and correlates the bar code with an item from a list in a database. Bar code scanners are described at (barcode.com/learning_center/how_do_scanners_work.shtml), hereby incorporated by reference may then check whether the item on the list contains a manufacturer's specific UPC code in step 59. If so, the system 20 may then check if the manufacturer purchased the rights to other virtual merchandising options for that item on the list associated with the UPC code in step 61.

If product protection 24 has been purchased, the system 20 runs through the logic to assess what has been purchased by the manufacturer and, where applicable, adds the complete product details (step 63), the brand logo (step 65), and any incentives, e.g. coupons, sales, banners (step 67) for the item on the list and optionally provides an aisle assignment in step 69.

The system 20 also checks for product linkage 26, as indicated in step 54 for each item on the list. Product linkage 26 relates to, for example, items that appear on the shopping list that may be linked to other items that do not appear on the shopping list. Examples of such linkages are as described above. As such, each item on the shopping list is checked whether product linkage 26 has been purchased by the manufacturer of the item on the list in step 56. If product linkage 26 has not been purchased by the manufacturer, as determined in step 56, the system 20 looks up any known unprotected potential linked items in step 60 and adds those unprotected items to a product link list in step 62, assuming it is not a duplicate, as determined in step 64. The system 20 then proceeds to the next item on the list, as illustrated in step 71 and returns to step 54 until all items on the initial shopping list have been analyzed.

If the system 20 determines in step 56 that product linkage protection 26 has been purchased for the item, the system 20 looks up the item on a product link list in step 58. Next, in step 64, the system 20 checks if the linked product is already on the product link list. If so, the system 20 does not add the item to the grocery list. If the item is not a duplicate, the item is added to the grocery list. For each linked item in the product link list for which product linkage has been purchased by the manufacturer, as indicated in step 71, the system 20 cheeks in step 73 whether other types of virtual merchandising has been purchased for the linked item, such as, i.e., brand displays 30, incentives, and whether any occurrence slots, have been purchased for the linked items.

After the portion of the grocery list that had protection purchased has been processed for linkages, the final version of the grocery list is created for those products that had a UPC and had protection purchased (steps 59 and 61, respectively), as indicated by the dotted block 73. In the completed grocery list, each item in the list has been evaluated for and is listed with one or more virtual merchandising options including: complete product details; brand display; and incentives, such as coupons or ads. As will be discussed in more detail below, if more than one manufacture has purchased switching incentives for the same item, the highest ranked manufacturer's information (coupon, banner, incentive) is displayed. A manufacturer's rank may be based upon several factors including the amount of money that the manufacturer paid for this right and/or the point in the rotation the consumer represents. Also, the grocery list may optionally include an aisle assignment for each item on the list.

If it is determined that a manufacture's specific UPC code is not associated with an item on the list or product protection has not been purchased for and item on the list (steps 59 and 61, respectively), the item is processed with generic product details, as indicated by the block 75. The system 20 next checks if switching incentives 28 have been purchased in step 77. If not, an aisle assignment may optionally be associated with the item, as indicated by the block 79. The system 20 then proceeds to the next item on the list.

If switching incentives 28 have been purchased, as determined in step 77, the system 20 looks up whether there are any incentives associated with the item covered by switching incentives 28 option, as indicated by the block 81 and associates the switched item with the item on the grocery list and incorporates an incentive, i.e coupon, sale information, in step 83, after it is determined that the switched item is not a duplicate in step 64. In step 85, the system 20 adds complete product details for the switched item. The system 20 also checks in step 85 whether virtual merchandising has been purchased for the switched item. If so, the system 20 adds, where appropriate, the virtual merchandising options purchased by the manufacturer for the switched item, such as, adding a brand display 30 for the switched item; adding incentives and checking the manufacturer's rank with respect to the switched item, by checking whether and how many occurrence slots have been purchased by the manufacturer. As discussed above, if the rank option has been purchased by any of the manufacturers', the switched products associated with items on the list are associated with a manufacturers' product according to rank, as discussed above.

Next, the system 20 creates a shopping list 85 that incorporates one or more of the virtual merchandising options, as discussed above. More particularly, the, two sets of products—(i) those with UPCs and product protection plus any products added through linkages and (ii) those without UPCs or without product protection are combined and processed. For embodiments which incorporate the product location, the aisle is associated with each item on the list and the list can be sorted in aisle order, as illustrated in step 109. The list is then formatted in step 111 and printed or sent to another type of interface (e.g. a mobile terminal, a blackberry, etc) in step 113.

Figure 5B:
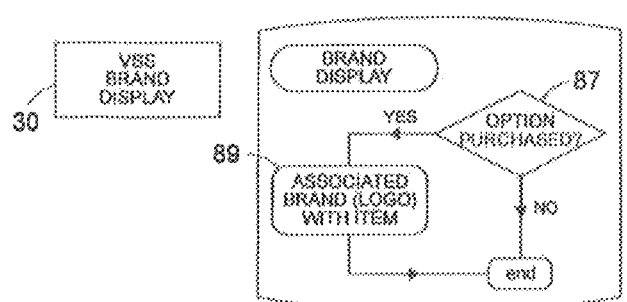
FIG. 5B is a flow chart illustrating the logic associated with implementing the brand display virtual merchandising option.

FIG. 5B is a flow chart illustrating the brand display virtual merchandising option 30. For each item on the list, the system 20 simply checks whether the brand display merchandising option has been purchased in step 87. If so, the manufacturer's brand logo is associated with that item on the shopping list in step 89. If not, generic information is associated with that particular item on the list.

Figure 5C:
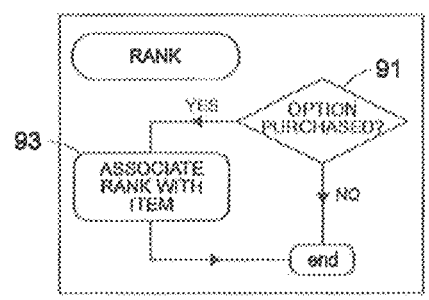
FIG. 5C is a flow chart illustrating the logic associated with determining whether or not a manufacturer has purchased rights for rank.

FIG. 5C is a flow chart illustrating the logic necessary to evaluate whether a manufacturer has purchased rights for rank, as discussed above. For example, a manufacturer's rank may be associated with the product switching virtual merchandising option 28. In particular, when there are multiple manufacturers' products available for switched products, the manufacturer which purchased a rank option prevails, as discussed above. In particular, for each item determines whether the rank option has been purchased by any manufacturer in step 91. If so, that manufacturer's product is associated with the switched item in step 93. If no manufacturer purchased the rank option ail manufacturers products for manufacture's that purchased the switching incentive virtual merchandising option will be associated with the switched item in the list.

Figure 5D:
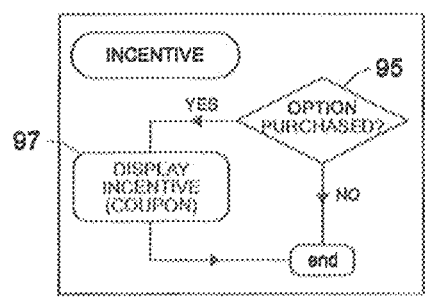
FIG. 5D is a flow chart illustrating the brand incentive virtual merchandising option.
Figure 14:
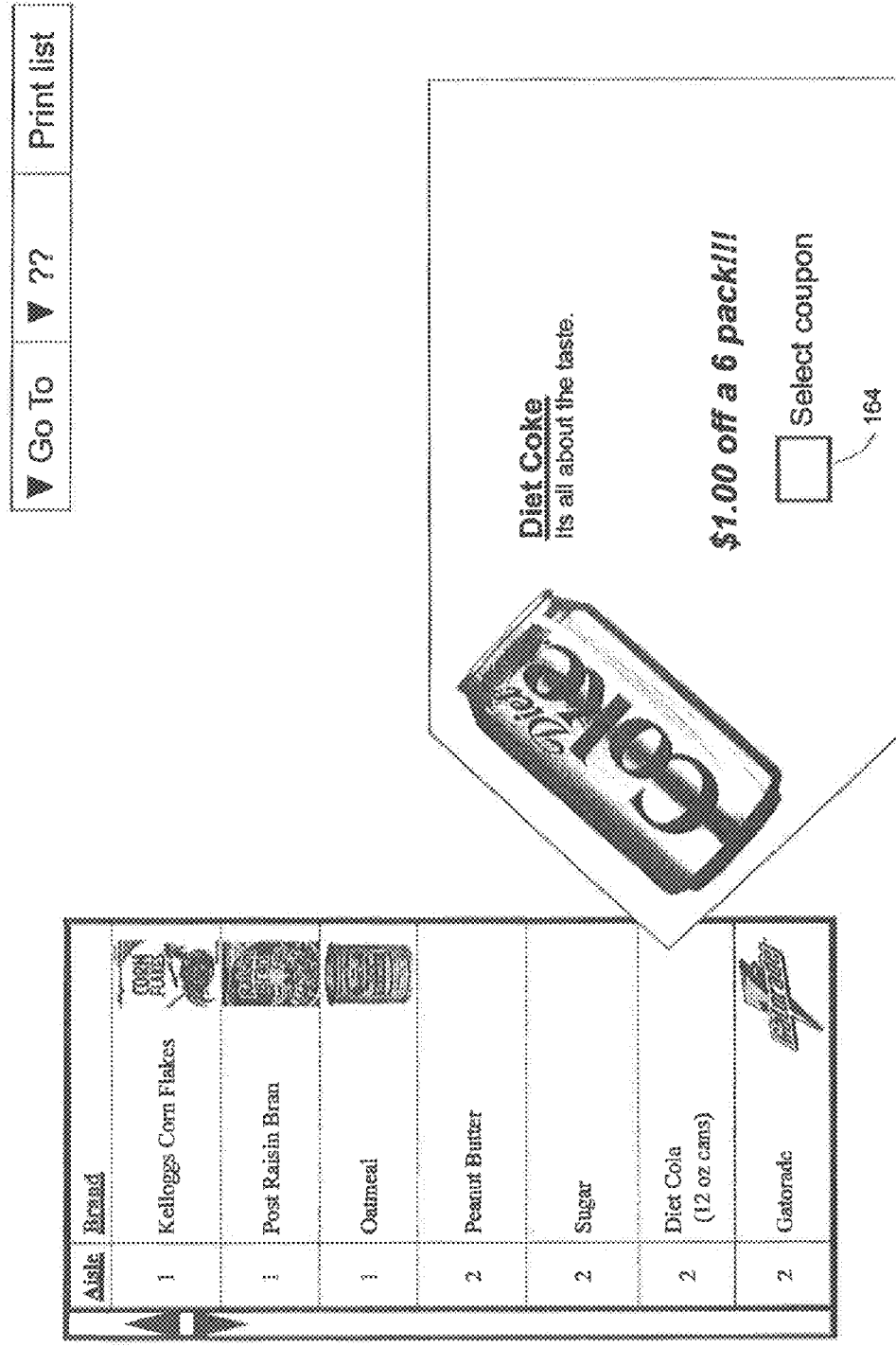
Figure 17:
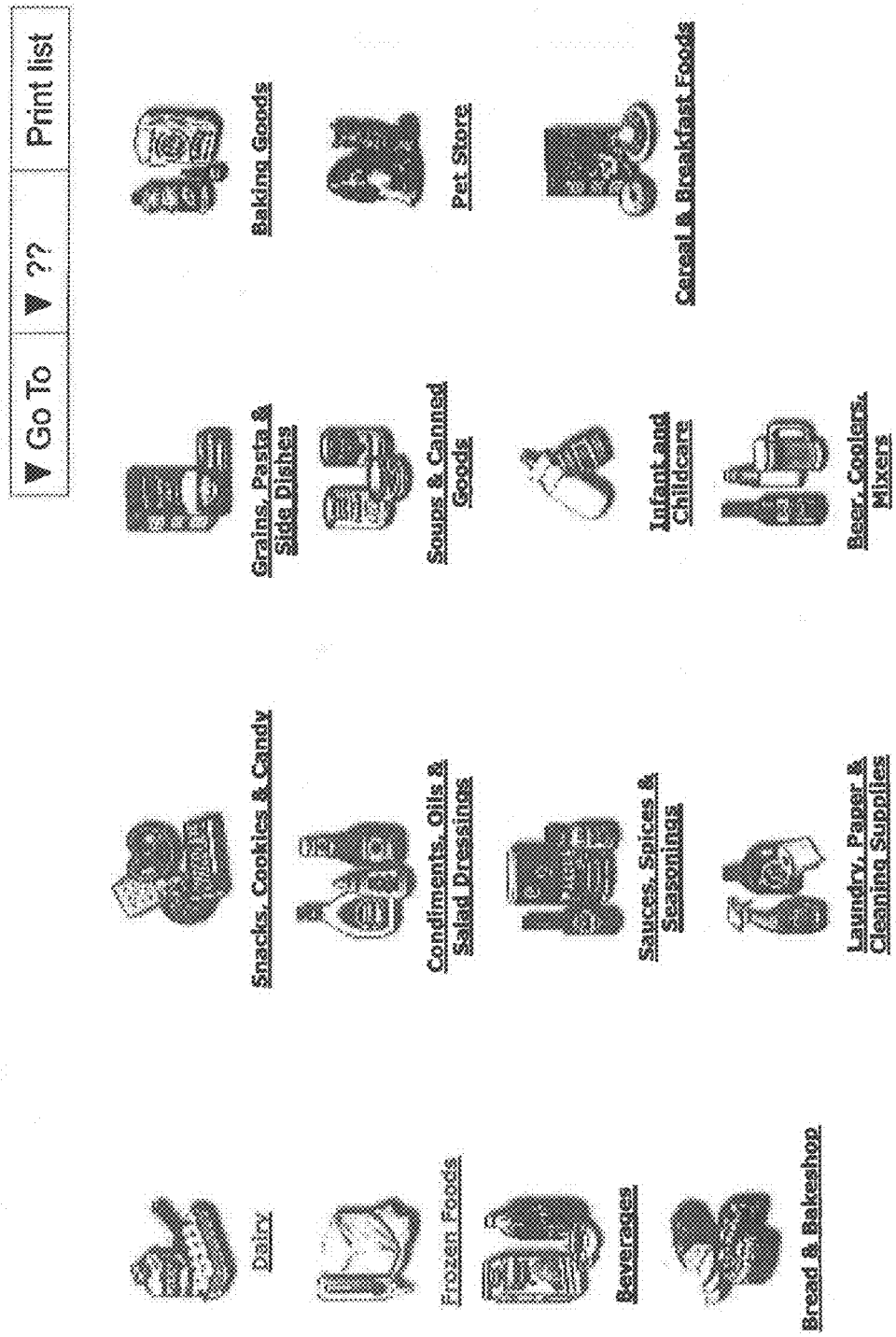
FIG. 17 illustrates an exemplary web page that represents all of the categories of available food items available in a particular store.

FIG. 5D is a flow chart illustrating the brand incentive virtual merchandising option. For each item on the list, the system 20 checks whether any manufacturer has purchased a partner incentive enhancement option. As discussed above, this option relates to the right of a manufacturer to have coupons or ads associated with particular items on the shopping list. For each item on the list, the system 20 checks whether any manufacturer. If so, the manufacturer's incentive, e.g., coupon or ad is associated with the shopping list in step 97, for example, as illustrated in FIGS. 14, 15 and 17.

Figure 5E:
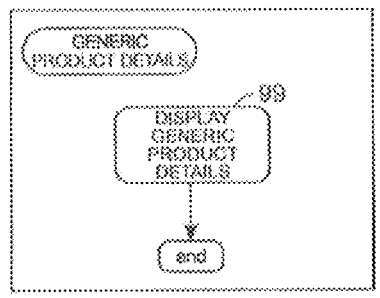
FIG. 5E is a flow chart for displaying generic product details of scanned items by a consumer.

FIG. 5E is a flow chart for displaying generic product details. These generic product details are the product details associated with the UPC code scanned by the consumer to create the initial shopping list. These product details are available as part of a master data base that would be compiled. An exemplary record layout and fields is illustrated in FIG. 4. These product details are linked to those items scanned by the consumer through the unique UPC.

Figure 5F:
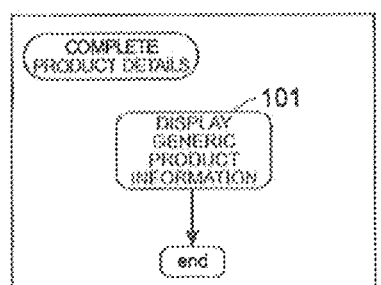
FIG. 5F is a flow chart for displaying complete product details of scanned items by a consumer.

FIG. 5F is a flow chart for displaying complete product details of scanned items by the Consumer. The complete product details include the product details, for example, description of the item and the brand logo associated with the item for items for which manufacturers have purchased the product protection virtual merchandising option 24. For items for which the product protection option has been purchased, a complete product description including the brand logo is may be associated with that item on the shopping list in step 101.

Figure 5G:
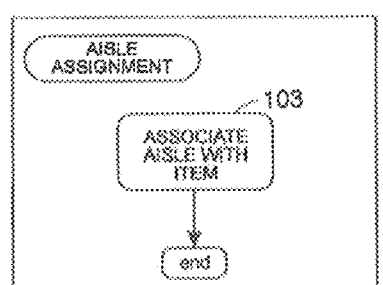
FIG. 5G is a flow chart illustrating the aisle assignment of an item on the shopping list item on the grocery list in step 103.

FIG. 5G is a flow chart illustrating the aisle assignment of an item on the shopping list. For embodiments which include this option, an aisle location is associated with each item on the grocery list in step 103.

Figure 5H:
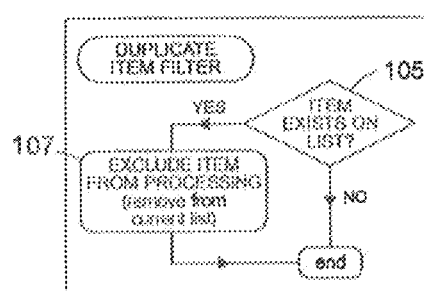
FIG. 5H is a flow chart for a duplicate item filter that checks for duplicate items on the shopping list.

FIG. 5H is a flow chart for a duplicate item filter that checks for duplicate items on the shopping list. The duplicate item filter 64 checks for duplicate items in step 105. As indicated by the block 107, duplicate items are excluded from the list. Any item that is not a duplicate continues to be processed.

Referring to FIG. 6, the logic for consumption pattern virtual merchandising option 22 is illustrated in detail. As mentioned above, the consumer or shopper scans the containers (UPCs) of consumed grocery items and downloads this data to the system 20 by either an in-store terminal or a web application, as discussed above, to form an initial shopping list, as generally indicated by the block 44. Every time a consumer creates an initial shopping list by scanning the packages of used items, those items are stored in a product consumption database, for example, and used to develop a consumer's historical shopping pattern. The historical shopping pattern could be implemented in several ways. For example, a periodic purchasing pattern could be developed. In particular, if a consumer purchased a particular food item on a fairly regular basis, and was not listed on a shopping list for some predetermined time, the item would be added to a shopping list as a possible missed item, For example, if a consumer added eggs to their shopping list on a weekly basis, eggs would be added to a consumer's shopping list if eggs were left off the list on a particular week.

In step 46, the system 20 may compare each item on the initial shopping list with a product consumption database to determine if any items in the consumer's product consumption pattern have been left off the list. The product consumption database is may be compiled for each customer based upon consumption patterns over a period of time. Items are identified as "missed items" in step 48 and combined with the initial shopping list in step 50 to create a revised shopping list, as identified by the block 52.

Figure 7:
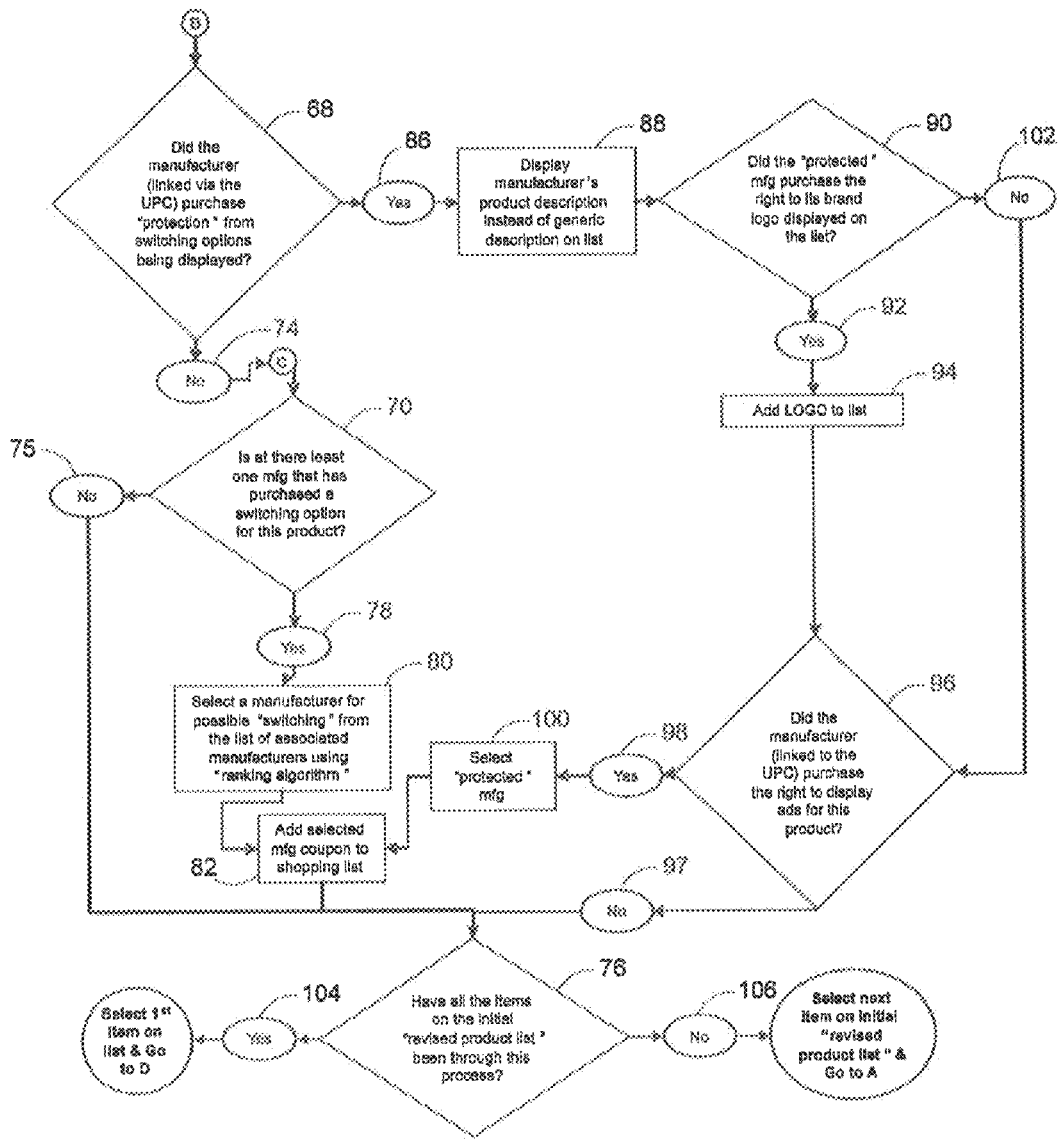

The product protection module 24 is illustrated in FIG. 7. As discussed above, product protection refers to a concept in which the manufacturer purchases the right to prevent other manufacturers from displaying any incentives, i.e. coupons, or brand logos that might provide incentive to a consumer to purchase an alternate brand for an item on the list. Referring first to FIG. 6, once a revised product or shopping list is created, as indicated by the block 52, the system 20 checks in step 66 for a manufacturer's specific uniform product code (UPC) or item on the revised shopping list. If not, as indicated by the block 51, the system 20 proceeds to step 68 (FIG. 7) to check Whether the manufacturer purchased product protection, as discussed above. If the system 20 determines in step 66 (FIG. 6) that a manufacturer specific UPC code is associated with a product on the list, as indicated by the block 72, the system 20 proceeds directly to step 70 (FIG. 7) to determine if any manufacturer purchased a switching option for the item on the list. Alternatively, if it is determined in step 68, that the manufacturer associated with the manufacturer specific UPC code did not purchase a switching option for the item on the list, as indicated by the block 74, the system 20 also proceeds to step 70 and checks if any manufacturer purchased a switching option for the item on the list. If not, as indicated by the block 75, the system 20 proceeds to step 76 to determine if all items on the shopping list have been checked. If at least one manufacturer has purchased a product switching option, as indicated by the block 78, the system 20 proceeds to step 80. If there is only one manufacturer that has purchased a switching option for that product, that manufacture's coupon or other incentive is added to the shopping list, as indicated by the block 82.

If it is determined in step 68 that the manufacturer associated with the manufacturer's UPC code purchased, indicated by the block 86, the manufacturer's product description is displayed on the shopping list instead of the generic description, as indicated by the block 88. Next in step 90, the system 20 checks whether protected manufacturer purchased the right to display their logo on the shopping list. If so, as indicated by the block 92, the system 20 displays the logo, as indicated by the block 94. Next in step 96, the system 20 checks whether the manufacturer purchased the right to display ads. If so, as indicated by the block 98, the system 20 categorizes the manufacturer as a protected manufacturer in step 100 and proceeds to step 82 and adds the manufacturer's coupon to the shopping list if it is determined in step 96 that the manufacturer did not purchase the right to display ads, as indicated by the block 97, the system 20 proceeds to step 76 to determine if the item processed was the last item on the grocery list. If it is determined in step 90 that the manufacturer did not purchase the right to add its logo to the grocery list, as indicated by the block 102, the system 20 proceeds directly to step 96 to determine if the manufacturer purchased the right to display ads, as discussed above.

As mentioned above, the system 20 checks in step 76 (FIG. 7) whether all items on the list have been processed. If so, as indicated by the block 104, the system 20 proceeds to step 56 (FIG. 5A) and checks each item on the list for linkage products, as discussed above. If the last item checked was not the last item on the list, as indicated by the block 106 (FIG. 7), the system 20 returns to step 66 (FIG. 6) and, if a UPC is associated with the item, repeats steps 68-100 (FIG. 7) for the next item on the list.

Figure 8:
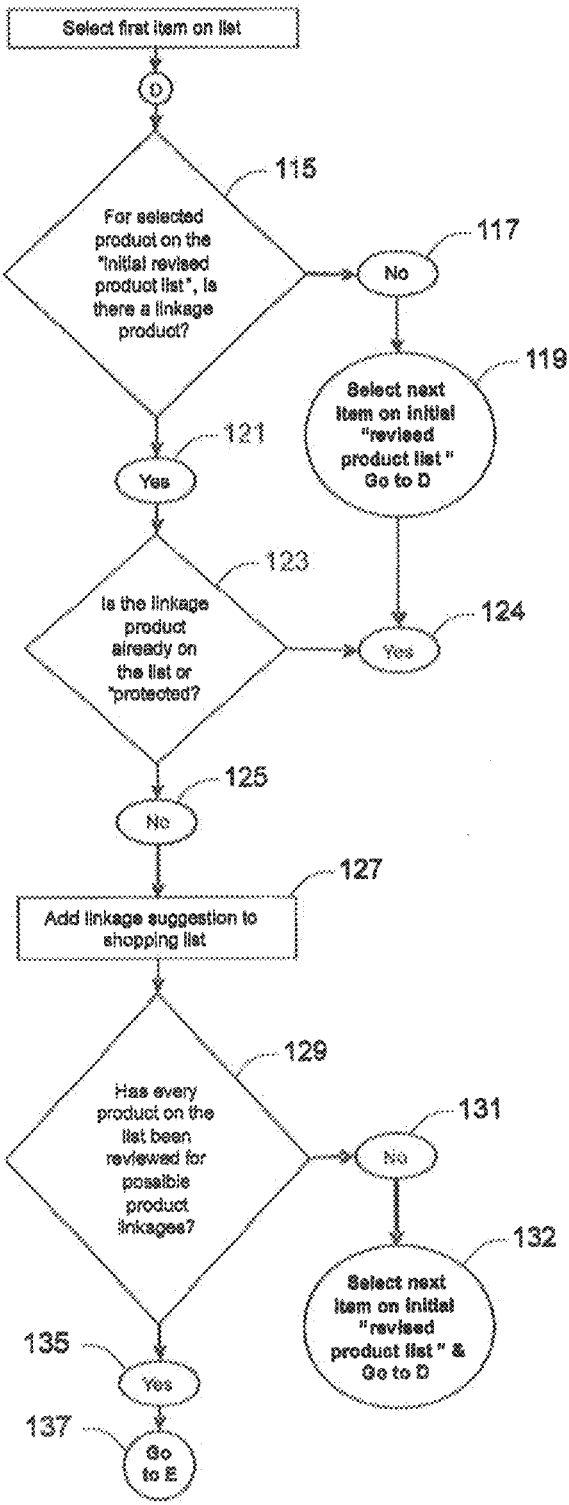

The product linkage virtual merchandising option 26 is illustrated in detail in FIG. 8. Referring to FIG. 8, the system 20 checks in step 115 whether there is a product linkage for an item on the list. If not, as indicated by the block 117, the system 20 checks the next item in step 119 until all items on the list have been checked. If a linkage product exists for an item on the list, as indicated by the block 121, the system 20 next checks in step 123 whether the linkage product is already on the list. If so, as indicated by the block 124, the system 20 proceeds to the next item on the list. If the linkage product is not on the list, the linked item is added to the list in step 127. Steps 115-127 are repeated until each item on the initial shopping list has been checked for possible product linkages, as indicated in step 129. If all items on the initial shopping list have not been checked for possible product linkages, as indicated by the block 131, the system 20 checks the next item on the list, as indicated by the block 133. If all items on the list have checked for product linkages, as indicated by the block 135, the system 20, as indicated in step 137, the system proceeds to step 140 (FIG. 9) and assigns an aisle and section to each item on the list, as discussed below.

Figure 9:
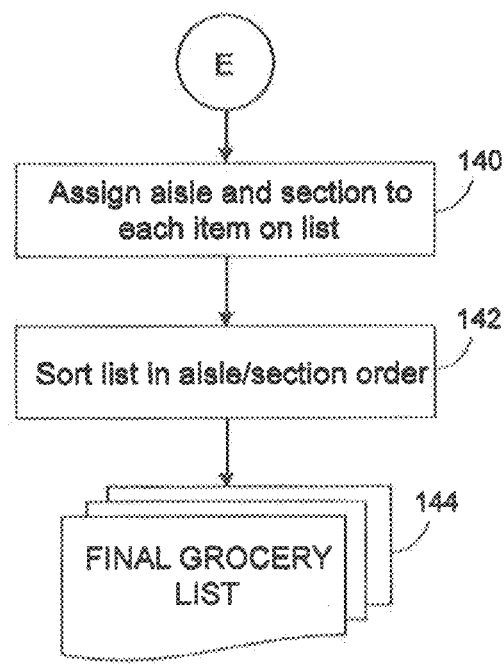

FIG. 9 is a flow chart which illustrates the process for assigning aisles to items on the shopping lists. For implementation of this embodiment of the invention, the store for which the shopping list is being created needs to have a database which not only provides current inventory but also the aisle and optionally section assignments of all items in the inventory. Referring to FIG. 9, for each item on the shopping list, the system 20 accesses the database mentioned above and associates an aisle and optional section with each item, as indicated by step 140. In order to facilitate the shopping experience, the system 20 sorts the shopping list by aisle and optional section order. In step 142 and upon demand prints a final grocery list in step 144.

Exemplary Grocery List

FIG. 10A illustrates an exemplary shopping list which illustrates various virtual merchandising options in accordance with the present invention. FIG. 10B is a table explaining how each virtual merchandising option in the shopping list illustrated in FIG. 10A would have been generated through the process in accordance with the present invention. The shopping list may be a physical list, printed on paper or an electronic list, available on a PDA, cell phone, tablet PC or other electronic display media.

Turning to FIG. 10A, the exemplary shopping list, generally identified with the reference numeral 146, may include the exemplary fields illustrated. In particular, the exemplary shopping list 146 may include a location field 148 which identifies the aisle in the store and other location information for each item on the shopping list 146. The shopping list 146 also includes an item field 150. The item field 150 is used to list the item, either generic or by brand name, depending on whether the manufacturer of the item purchased the brand rights as discussed above. A field 152 may be used for brand logos for items for which the manufacturer of the item purchased those rights. Another field 154 may be used to display incentives for items in which the manufacturer purchased incentive rights, as discussed above. A comment field 156 may he included to identify linked and missed items, for example.

Web Embodiment—Non Interactive

The function of the in-store terminal can also be replicated in a web-based embodiment. The process is illustrated in FIG. 1, although the terminal is remote and the master databases (e.g. store layout, product info, etc.) is accessed remotely. In this embodiment, a prospective customer simply registers on-line for the service with their store of choice. All of the processing mentioned above is done by a remote server, which not only processes the shopping list. The consumer may download a client application onto the consumer's personal computer (PC) or smart phone for interacting with the remote server and utilizing the shopping list functionality described above. More particularly, as discussed above, the consumer may scan consumed items by way of a bar code scanner, as discussed above. Alternatively, the consumer can select from a list. More particularly, the remote server may have access to a number of grocery and other items on a searchable database. The items may be searchable by the consumer by way of a generic name and/or a brand name. The search feature may be initiated by selection of an icon on a display hosted by the client application. Once the icon is selected, a text box and a keyboard may be displayed. The consumer types the desired item into the text box and selects a "search " button. Selection of the search button causes the system to display all generic and/or brand items that match the text in the text box. For example, if "soap" is typed in the text box, the following generic and/or branded items may be listed:

Bar Soap & Body Wash
    Hand Soap and Sanitizers
    Dish Liquid Soap
    Ivory Bath Soap Classic with brand logo (assuming brand protection is purchase)
    CareOne Foaming Hand Soap Olive & Ace-no logo.

Selection of an item automatically adds that item to the shopping list. Because of the possibility of competing items, each branded item with or without logo protection may be provided with its ranking, as discussed above. The bar code data for scanned and other retail items is stored in the remote database. When the consumer wants to compose a shopping list, the consumer logs onto the remote server and uploads the bar code data or uses the text box, as discussed above, The remote server associates each item of bar code data with an item, such as a food item and assembles a basic shopping list, This processing is exactly the same as would be done in the in-store application and is illustrated in FIGS. 5A-H and FIGS. 6-9. For each item on the list, the system 20 checks whether items have been missed and whether any virtual merchandising rights have been purchased, as discussed above, to create an enhanced shopping list, for example, as illustrated in FIG. 10A.

Interactive Shopping Experience

The generation of the consumer's shopping list could also be done in a more interactive manner, obtaining consumer input during the generation of the list rather than simply generating an enhanced shopping list that the consumer then uses throughout the store. This type of embodiment maybe a web-based application given the constraints of time associated with in-store processing (e.g. a consumer is more likely to spend time at home in front of the computer rather than standing in a store) as well as the hardware costs that an in-store interactive experience would require (retailers would need significantly more terminals in store to avoid lines associated with the time an interactive process would take). The screen layouts (aka web pages), illustrated in FIGS. 11-18 are exemplary.

FIG. 11 illustrates an exemplary initial screen that is generated by the remote server after the shopping list 158 has been compiled, as discussed above. Each web page may include a button, generally identified with the reference numeral 160 that allows the consumer to continue to the next page.

Figure 12:
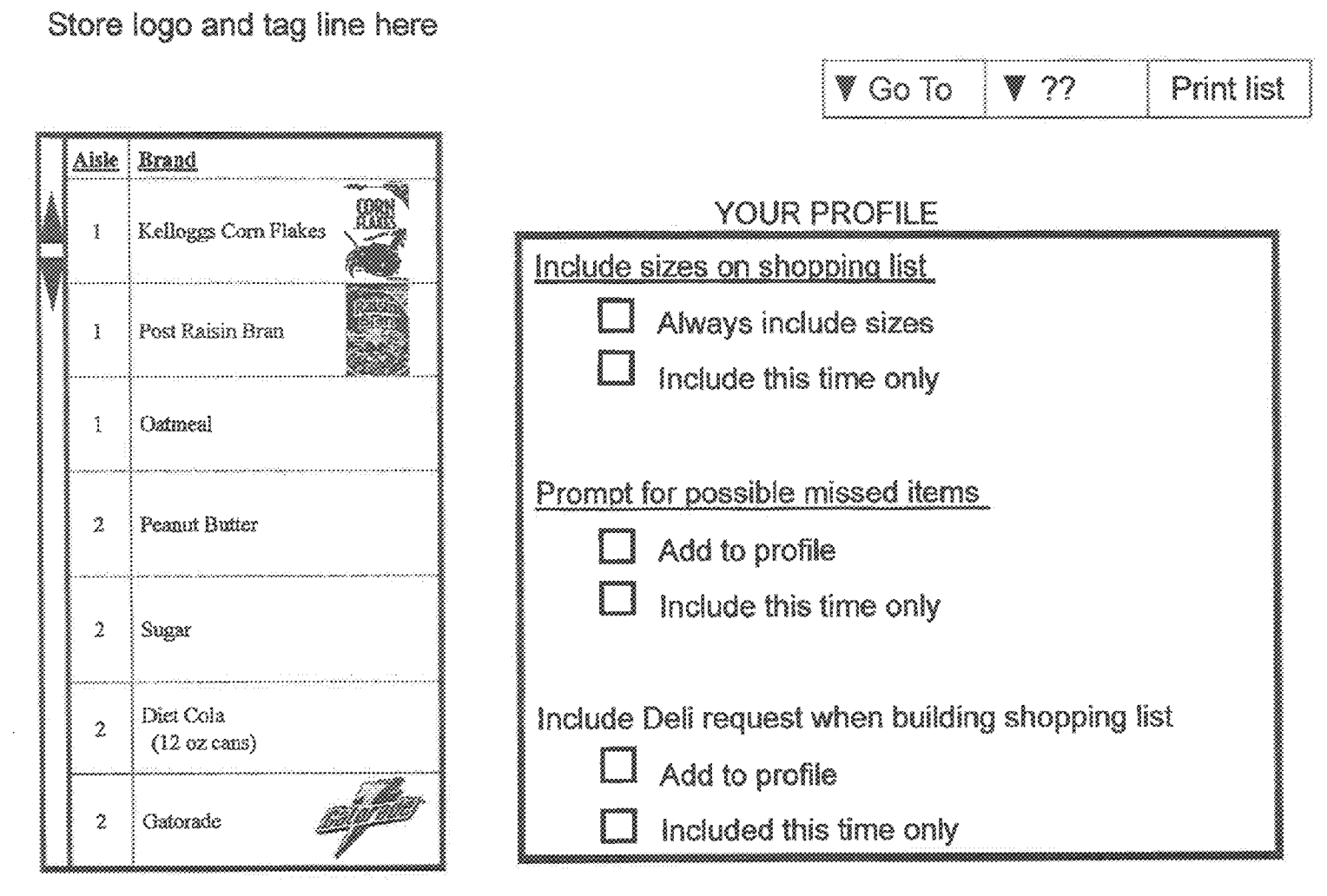

FIG. 12 illustrates an exemplary next page which allows the consumer to create a personal profile with respect to the shopping list. As shown, various display choices may be selected for a single shopping list or added to the consumer's personal profile. A consumer would only have to establish this profile once, as this information would then be retained in the central database as being specific to each customer.

Figure 13:
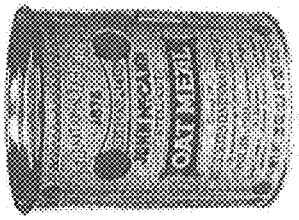

FIG. 13 illustrates a web page which illustrates a manufacturer's incentive for oatmeal. In this example, the consumer needs to purchase oatmeal. In this example, the consumer either listed a generic oatmeal or branded oatmeal that was not protected. In either case, since, in this example, McCann's purchased switching incentives. McCann's is automatically displayed as a switching option. If the consumer checks the check box 162 for the coupon, the coupon is may be printed (or electronically added to the shopping list) or alternatively displayed for scanning at checkout. The manufacturers brand logo may be printed (or displayed) next to the oatmeal, as shown in FIG. 14. FIG. 14 also illustrates a similar scenario for diet cola and a check box 164. If the Check box 164 is selected, the brand logo is inserted next to the item on the shopping list 165, as illustrated in FIG. 15. For both of these items, the coupon information is added to the final shopping list, as illustrated in FIG. 16 or alternatively as bar codes for scanning at checkout.

FIG. 15 illustrates two (2) examples of incentives. The first example relates to Lays® potato chips. In this example, potato chips are listed on the shopping list, such items having been consumed and the manufacturer of the consumed product having not purchased product protection. As such, potato chips are may be added to the list as a generic item or alternatively as a branded item. Using the logic in FIG. 7, the system 20 can offer an incentive from a manufacturer which purchased switching incentives automatically, as discussed above. In this case, the company offers an incentive by offering $1.00 off a 20 ounce bag. If the consumer checks the check box next to the Lays® incentive, the brand logo for Lays® will be inserted next to the listing for "potato chips" on the shopping list and the coupon notation will be added to the shopping list as illustrated in FIG. 16.

The other type of incentive illustrated in FIG. 15 is for an item not on the shopping list, but one that is linked to an item that is on the list, an example of virtual merchandising. That item is Smuckers® preserves which, in this example, has been linked to peanut butter. This example illustrates a situation in which the manufacturer purchased a virtual merchandising and, together with the right to display a coupon, purchased the brand display option as well, as discussed above. If the consumer checks the check box next to the Smuckers® incentive, Smuckers®, together with the brand logo for Smuckers® will be added to the shopping list and the coupon notation will be added to the shopping list as illustrated in FIG. 16.

FIG. 16 illustrates an exemplary web page with a completed shopping list and may also include a drop down menu 166, which provides various options for the consumer to select and skip to, such as providing a complete coupon list, listing possible missed items, placing deli orders, going to the store categories section to add items and displaying the consumer profile.

The completed shopping list is displayed for example, as illustrated in FIGS. 10A and 16 and a "Print List" button 168 (FIG. 16) may be provided so that a printed copy of the grocery list can he provided. As shown, each web page may he provided with a Print list button that enables the consumer to print the list at any stage of the complete process. In addition, each web page as shown may he provided with a "Go To" button that allows the consumer to jump to various sections of the interactive session.

Figure 18:
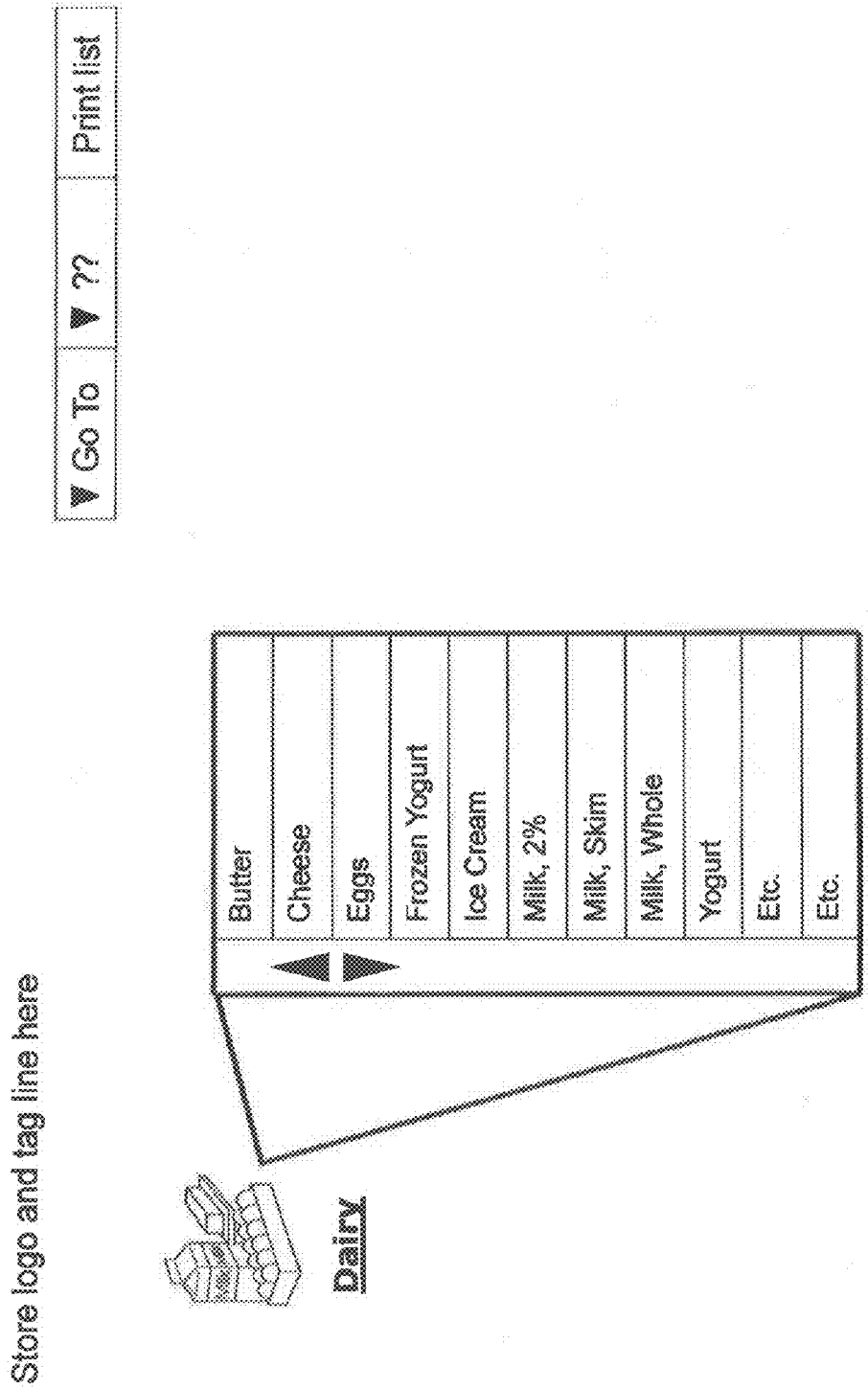
FIG. 18 illustrates an exemplary drop down list for one category of food items in FIG. 17, namely "dairy".

FIG. 17 illustrates the web page that, as shown, represents all of the various items available in the store, grouped by category, to enable the consumer to take a virtual shopping tour of all of the items available in the store. In order to add items to the shopping list, a user simply selects a category (FIG. 17) and the system 20 displays, either as a separate page or as a "drop down" list, as illustrated in FIG. 18, all available "generic" items in that category, as exemplified for the selection of "dairy". A user then simply checks the item listed under a particular category to add that item to the shopping list. After this selection process, the system 20 logic could run through the various scenarios on these new, generic items that the consumer added to the list, displaying switching alternatives and pairing options for the consumer to select from. Alternatively, the consumer can select items by way of a text box, as discussed above.

Figure 19A:
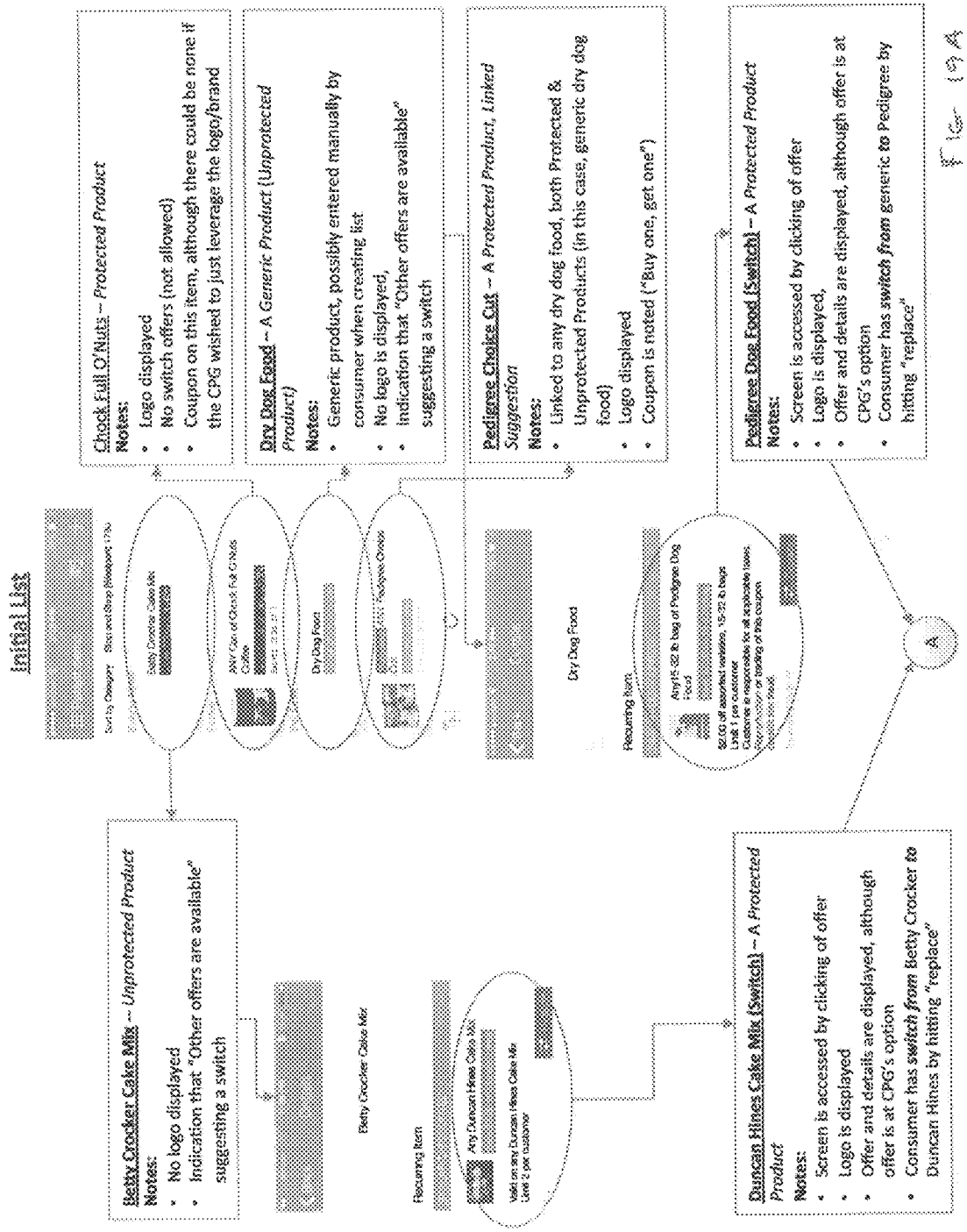

FIGS. 19A and 19B illustrate an exemplary shopping list and the application of the enhanced shopping and merchandising system described above.

Obviously, many modifications and variations of the present invention are possible in light of the above teachings. Thus, it is to he understood that, within the scope of the appended claims, the invention may be practiced otherwise than as specifically described above.

What is claimed and desired to be secured by a Letters Patent of the United States is:

We claim:
1. A method for automatically generating a shopping list for use in a retail store, the method comprising the steps of:
(a) storing in a computer memory device a plurality of generic and branded retail items available for purchase in a retail store defining stored retail items;

(b) providing an electronic interface for enabling consumers to select generic and branded retail items stored in said computer memory device defining selected retail items;

(c) providing an option to a manufacturer to acquire one or more virtual merchandising options for one or more retail items which associates said one or more merchandising options with said one or more retail items defining protected products in said computer memory device;

(d) creating by a digital computer under program control an electronic shopping list of said selected retail items;

(e) determining for each said selected retail item whether said virtual merchandising option has been acquired and for selected retail items for which no virtual merchandising option has been acquired;

(f) storing one or more virtual merchandising options on a computer memory device and wherein said digital computer is programmed to determine if the list contains selected branded retail items for which no virtual merchandising option has been acquired and automatically switching said selected retail item with an alternative protected product-is available and is a comparable alternative to the selected retail item; and (g) displaying an electronic shopping list on an electronic display on a mobile device with said selected and switched items.

2. The method as recited in claim 1 wherein said virtual merchandising option comprises virtual product protection which protects protected items from being switched or having other products being presented as potential switches/substitutions.

3. The method as recited in claim 1 wherein said virtual merchandising option comprises brand display which comprises displaying a brand logo for a protected item.

4. The method as recited in claim 1 wherein said virtual merchandising option comprises partner incentive enhancements which comprises displaying purchasing incentives for protected items.

5. The method as recited in claim 4 wherein said purchasing incentives include coupons.

6. The method as recited in claim 1 wherein said virtual merchandising option comprises product linkage which comprises displaying a linked product with a protected item.

7. The method as recited in claim 1, wherein said electronic interface in step (b) includes the step of enabling users to scan UPC codes of items previously purchased defining scanned items.

8. The method as recited in claim 7, wherein step (b) includes the step of storing branded retail items.

9. The method as recited in claim 1, wherein said electronic interface in step (b) includes the step of enabling the selection of retail items from a predetermined list.

10. The method as recited in claim 9, wherein said predetermined list includes generic retail items.

11. The method as recited in claim 9, wherein step (b) includes branded retail items.

12. The method as recited in claim 1, further including the steps of determining consumption patterns of said consumer and adding at least one item to said electronic shopping list as a function of said consumption patterns.

13. The method as recited in claim 1, further including the steps of determining the location of said items in said retail store, associating the location with said item, and displaying the location on said electronic shopping list.

14. The method as recited in claim 1, further including the step of arranging said electronic shopping list as a function of said locations.

15. A method for automatically generating a shopping list for use in a retail store, the method comprising the steps of:

(a) storing in a computer memory device a plurality of generic and branded retail items available for purchase in a retail store defining stored retail items and one or more merchandising options in said computer memory device;

(b) providing an electronic interface for enabling consumers to select generic and branded retail items stored in said computer memory device defining selected retail items;

(c) providing an option to a manufacturer to acquire one or more virtual merchandising options for one or more retail items which associates said one or more merchandising options with said one or more retail items in said computer memory device;

(d) creating by a digital computer under program control an electronic shopping list of said selected retail items;

(e) determining for each said selected retail item whether said virtual merchandising option has been acquired:

(1) for selected generic retail items for which no virtual merchandising option has been acquired, automatically displaying by way of a digital computer under program control a user selectable switching option for an equivalent product for which a merchandising option has been acquired; or (2) for selected branded retail items for which no virtual merchandising option has been acquired, automatically displaying a user selectable switching option for an equivalent product for which a merchandising option has been acquired; and (f) displaying an electronic shopping list on an electronic display on a mobile device with said selected items and said user selectable switching options.

16. The method as recited in claim 15 wherein said user selectable option displays an equivalent product along with said selected retail item when said user selectable switching option is selected.

17. The method as recited in claim 16 wherein said equivalent product is displayed along with the equivalent product and a user selectable replace option which causes the selected item to be switched when said user selectable replace option is selected.

18. The method as recited in claim 15 wherein said user selectable option displays an equivalent product to be displayed without the selected item when said user selectable switching option is selected.

19. The method as recited in claim 15 wherein said virtual merchandising option comprises virtual product protection which protects protected items from being switched.

20. The method as recited in claim 15 wherein said virtual merchandising option comprises brand display which comprises displaying a brand logo for a protected item.

21. The method as recited in claim 15 wherein said virtual merchandising option comprises partner incentive enhancements which comprise displaying purchasing incentives for protected items.

22. The method as recited in claim 21 wherein said purchasing incentives include coupons.

23. The method as recited in claim 15 wherein said virtual merchandising option comprises product linkage which comprises displaying a linked product with a protected item.

24. The method as recited in claim 15, wherein step (b) includes the step of scanning UPC codes of items previously purchased defining scanned items.

25. The method as recited in claim 15, wherein step (b) includes the step of selecting retail items from a predetermined list.

26. The method as recited in claim 15, wherein said predetermined list includes generic retail items from a predetermined list.

27. The method as recited in claim 15, further including the steps of determining consumption patterns of said consumer and adding at least one item to said electronic shopping list as a function of said consumption patterns.

28. The method as recited in claim 15, further including the steps of determining the location of said items in said retail store, associating the location with said item, and displaying the location on said electronic shopping list.

29. The method as recited in claim 15 further including the step of displaying the selected branded items for which no virtual merchandising option has been acquired and virtual merchandising has not been purchased for an equivalent product.

30. A computer system for generating a shopping list, the computer system comprising: a memory device for storing retail data on available branded and generic retail items and merchandising options; a digital computer programmed to:
   (a) enable a virtual merchandising option which allows a manufacturer's virtual merchandising options to be associated with one or more retail items stored on said memory device;
   (b) receive consumer data a relating to retail branded and generic items selected defining selected retail items;
   (c) determine if a virtual merchandising option has been associated with said selected retail items;
      (1) if said merchandising option has been purchased for said selected retail item, display said selected retail item on said electronic shopping list;
      (2) for selected generic retail items for which no virtual merchandising option has been acquired, automatically switching by said digital computer under program control said selected generic retail item with an equivalent product for which a merchandising option has been acquired; or
      (3) for selected branded retail items for which no virtual merchandising option has been acquired, automatically switching said selected branded retail item with an equivalent product for which a merchandising option has been acquired;
      (4) for selected branded retail items for which no virtual merchandising option has been acquired and virtual merchandising has not been purchased for an equivalent product displaying said selected item;
   (d) displaying an electronic shopping list on an electronic display of a mobile device with said selected and switched items.

31. The computer system as recited in claim 30, wherein said virtual merchandising option comprises virtual product protection which protects protected items from being switched.

32. The computer system as recited in claim 31 wherein said virtual merchandising option comprises brand display which comprises displaying a brand logo for a protected item.

33. The computer system as recited in claim 31 wherein said virtual merchandising option comprises partner incentive enhancements which comprises displaying purchasing incentives for protected items.

34. The computer system as recited in claim 31 wherein said purchasing incentives include coupons.

35. The computer system as recited in claim 31 wherein said virtual merchandising option comprises product linkage which comprises displaying a linked product with a protected item.

36. The computer system as recited in claim 31, wherein said electronic interface in step (b) includes the step of enabling users to scan UPC codes of items previously purchased defining scanned items.

37. The computer system as recited in claim 31, wherein said virtual merchandising options include determining consumption patterns of said consumer and adding at least one item to said electronic shopping list as a function of said consumption patterns.

38. A method for generating a shopping list for a retail store, by way of a digital computer having a memory for storing virtual merchandising options, said digital computer programmed to do the following steps:
   (a) enable a virtual merchandising option which allows a manufacturer's virtual merchandising options to be associated with one or more retail items stored on said memory device;
   (b) receive consumer data a relating to retail branded and generic items selected defining selected retail items;
   (c) determine if a virtual merchandising option has been associated with said selected retail items and under program control take the following steps:
      (1) if said merchandising option has been purchased for said selected retail item, display said selected retail item on said electronic shopping list;
      (2) for selected generic retail items for which no virtual merchandising option has been acquired, automatically displaying a user selectable switching option for an equivalent product for which a merchandising option has been acquired; or
      (3) for selected branded retail items for which no virtual merchandising option has been acquired and virtual merchandising has not been purchased for an equivalent product displaying said selected retail item.
   (d) displaying an electronic shopping list on an electronic display of a mobile device with said selected and switched items.

39. The computer system as recited in claim 38 wherein said virtual merchandising option comprises virtual product protection which protects protected items from being switched.

40. The computer system as recited in claim 39 wherein said virtual merchandising option comprises brand display which comprises displaying a brand logo for a protected item.

41. The computer system as recited in claim 39 Wherein said virtual merchandising option comprises partner incentive enhancements which comprises displaying purchasing incentives for protected items.

42. The computer system as recited in claim 39 wherein said purchasing incentives include coupons.

43. The computer system as recited in claim 39 wherein said virtual merchandising option comprises product linkage which comprises displaying a linked product with a protected item.

44. The computer system as recited in claim 39, wherein said electronic interface in step (b) includes the step of enabling users to scan UPC codes of items previously purchased defining scanned items.

45. The computer system as recited in claim 39, wherein said virtual merchandising options include determining consumption patterns of said consumer and adding at least one item to said electronic shopping list as a function of said consumption patterns.

\* \* \* \* \*